United States Patent
Toya et al.

(10) Patent No.: US 11,028,798 B2
(45) Date of Patent: Jun. 8, 2021

(54) INTERNAL-COMBUSTION-ENGINE CONTROL DEVICE AND CONTROL METHOD

(71) Applicant: TOYOTA JIDOSHA KABUSHIKI KAISHA, Toyota (JP)

(72) Inventors: Masanori Toya, Toyota (JP); Tomohiro Nakano, Nagoya (JP); Akihiko Higuchi, Toyota (JP); Takayuki Omachi, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/643,882

(22) PCT Filed: Aug. 23, 2018

(86) PCT No.: PCT/JP2018/031127
§ 371 (c)(1),
(2) Date: Mar. 3, 2020

(87) PCT Pub. No.: WO2019/049674
PCT Pub. Date: Mar. 14, 2019

(65) Prior Publication Data
US 2020/0347795 A1    Nov. 5, 2020

(30) Foreign Application Priority Data

Sep. 5, 2017  (JP) .............................. JP2017-170476
Mar. 27, 2018 (JP) .............................. JP2018-060404
(Continued)

(51) Int. Cl.
*F02B 1/00*     (2006.01)
*F02D 41/30*    (2006.01)
(Continued)

(52) U.S. Cl.
CPC ....... *F02D 41/3094* (2013.01); *F02D 41/047* (2013.01); *F02D 41/1454* (2013.01);
(Continued)

(58) Field of Classification Search
CPC ...... F02M 51/00; F02M 69/00; F02M 69/044; F02D 41/3094; F02D 41/402
(Continued)

(56) References Cited

U.S. PATENT DOCUMENTS 5,320,079 A       6/1994  Kuwabara
2005/0274353 A1  12/2005  Okubo et al.
(Continued)

FOREIGN PATENT DOCUMENTS

| JP | 5-214985    | 8/1993  |
|----|-------------|---------|
| JP | 5-256172    | 10/1993 |
| JP | 11-36943    | 2/1999  |
| JP | 2004-092488 | 3/2004  |
| JP | 2005-023850 | 1/2005  |
| JP | 2005-188293 | 7/2005  |
| JP | 2005-291133 | 10/2005 |
| JP | 2006-037738 | 2/2006  |

(Continued)

*Primary Examiner* — John Kwon
(74) *Attorney, Agent, or Firm* — Finnegan, Henderson, Farabow, Garrett & Dunner, LLP

(57) ABSTRACT

A port injection valve injects fuel to an intake passage. In multiple injection processing, a demanded injection quantity of the fuel is divided into a synchronous injection quantity and a non-synchronous injection quantity in accordance with at least one of: the load, which is a physical quantity having a correlation with the amount of air to be filled; and the temperature of an internal-combustion engine. The fuel is injected through intake non-synchronous injection and intake synchronous injection in this order. In the intake synchronous injection, the fuel is injected synchronously with a valve-open period of an intake valve. In the intake non-synchronous injection, the fuel is injected at a timing more advanced than in the intake synchronous injection.

12 Claims, 12 Drawing Sheets

(30) Foreign Application Priority Data

| | | | |
|---|---|---|---|
| Mar. 27, 2018 | (JP) | ............................. | JP2018-060412 |
| Apr. 27, 2018 | (JP) | ............................. | JP2018-087744 |
| Apr. 27, 2018 | (JP) | ............................. | JP2018-087745 |
| May 11, 2018 | (JP) | ............................. | JP2018-092491 |
| May 17, 2018 | (JP) | ............................. | JP2018-095430 |
| Jun. 25, 2018 | (JP) | ............................. | JP2018-119825 |

(51) Int. Cl.
*F02D 41/04* (2006.01)
*F02D 41/14* (2006.01)
*F02D 41/34* (2006.01)
*F02D 41/00* (2006.01)

(52) U.S. Cl.
CPC ...... *F02D 41/345* (2013.01); *F02D 2041/001* (2013.01); *F02D 2200/021* (2013.01); *F02D 2200/101* (2013.01)

(58) Field of Classification Search
USPC .......................................... 123/429–432, 434
See application file for complete search history.

(56) References Cited

U.S. PATENT DOCUMENTS

| | | | |
|---|---|---|---|
| 2007/0163536 A1 | 7/2007 | Okubo et al. | |
| 2019/0301390 A1* | 10/2019 | Miyata | .................... F02D 41/34 |
| 2020/0224623 A1* | 7/2020 | Fuse | ...................... F02D 41/34 |

FOREIGN PATENT DOCUMENTS

| | | |
|---|---|---|
| JP | 2007-107405 A | 4/2007 |
| JP | 2007-263047 | 10/2007 |
| JP | 2010-223063 | 10/2010 |
| JP | 2011-149333 | 8/2011 |
| JP | 2012-136959 | 7/2012 |
| JP | 2013-209938 | 10/2013 |
| JP | 2014-202178 | 10/2014 |
| JP | 2014-211130 | 11/2014 |
| JP | 2014-234730 | 12/2014 |
| JP | 2015-059456 | 3/2015 |
| JP | 2015-169171 | 9/2015 |

\* cited by examiner

INTERNAL-COMBUSTION-ENGINE CONTROL DEVICE AND CONTROL METHOD This application is a national stage application of International Application No. PCT/JP2018/031127, filed Aug. 23, 2018, and which is based upon and claims the benefit of priority from Japanese Patent Application Nos. 2017-170476, filed Sep. 5, 2017; 2018-060404, filed Mar. 27, 2018; 2018-060412, filed Mar. 27, 2018; 2018-087744, filed Apr. 27, 2018; 2018-087745, filed Apr. 27, 2018; 2018-092491, filed May 11, 2018; 2018-095430, filed May 17, 2018; and 2018-119825, filed Jun. 25, 2018, the entire contents of which are incorporated herein by reference.

TECHNICAL FIELD

The present disclosure relates to a control device and a control method for fuel injection of an internal combustion engine. The control device and the control method control the internal combustion engine including a port injection valve that injects fuel into an intake passage.

BACKGROUND ART

Patent Document 1 describes an example of a fuel injection control device that calculates a pulse width τa, which corresponds to a fuel amount requested based on an intake air amount, and operates a fuel injection valve based on the pulse width τa.

Further, the control device described in Patent Document 1 executes a multiple injection process by operating a port injection valve in order to inject the fuel amount requested based on an intake air amount. The multiple injection process injects the requested fuel amount by splitting fuel injection to an intake stroke injection for injecting fuel in the intake stroke and a combustion stroke injection for injecting fuel in the combustion stroke. In detail, the control device sets a split ratio of the intake stroke injection to the combustion stroke injection in accordance with the rotation speed of a crankshaft of the internal combustion engine.

PRIOR ART DOCUMENTS

Patent Documents

Patent Document 1: Japanese Laid-Open Patent Publication No. 5-256172

SUMMARY OF THE INVENTION

Problems that the Invention is to Solve

More specifically, the control device described in Patent Document 1 injects fuel by splitting fuel injection to the intake stroke injection for injecting fuel in the intake stroke and the combustion stroke injection for injecting fuel in the combustion stroke subsequent to the intake stroke. A split ratio R, with which the fuel injection is split to the intake stroke injection and the combustion stroke injection, is set in accordance with the rotation speed. When the temperature of the internal combustion engine is low, injecting fuel twice by determining the split ratio R in accordance with the rotation speed as described above may not be able to sufficiently limit the number (PN) of particulate matter (PM).

Means for Solving the Problem

Examples of the present disclosure will now be described.

Example 1: A control device for fuel injection of an internal combustion engine is provided. The internal combustion engine that is subject to control performed by the control device includes a port injection valve that injects fuel into an intake passage. The control device is configured to execute a requested injection amount calculation process for calculating a requested injection amount for controlling an air-fuel ratio to a target air-fuel ratio based on an air amount filling a cylinder of the internal combustion engine and an operation process for operating the port injection valve in order to inject fuel of the requested injection amount. The operation process includes a multiple injection process for injecting fuel in sequence from an intake asynchronous injection to an intake synchronous injection by splitting the fuel of the requested injection amount to a synchronous injection amount and an asynchronous injection amount in accordance with at least one of two parameters that are load that is a physical quantity having a correlation with the filling air amount and a temperature of the internal combustion engine, the synchronous injection amount being an injection amount of the intake synchronous injection of injecting fuel in synchronization with an open period of an intake valve, the asynchronous injection amount being an injection amount of the intake asynchronous injection of injecting fuel at a timing that is more advanced than a timing of the intake synchronous injection.

The inventor found out that if the fuel of the requested injection amount is all injected prior to the intake stroke when the temperature of the internal combustion engine is low, the number (PN) of particulate matter (PM) may increase depending on load. That is, if the fuel of the requested injection amount is all injected with the intake asynchronous injection when the temperature of the internal combustion engine is low, PN may increase depending on the load. This is because when the amount of fuel collecting on the intake passage increases, shearing the collected fuel presumably causes some of the collected fuel to flow into the combustion chamber in a state in which they remain droplets, thereby generating PM. In the above-described configuration, some of the requested injection amount is injected with the intake synchronous injection to reduce the asynchronous injection amount. This consequently reduces the amount of fuel collecting on the intake passage. This prevents situations in which shearing the collected fuel causes the fuel to flow into the combustion chamber in a state in which the fuel remains droplets. The inventor also found out that when the synchronous injection amount increases, PN increases on the contrary. The above-described configuration defines how to split the requested injection amount to the asynchronous injection amount to the synchronous injection amount in accordance with at least one of two parameters, namely, the load having a strong correlation with PN and the temperature having a strong correlation with the amount of fuel collecting on the intake passage. The load and the temperature are parameters having information used to determine how to reduce the asynchronous injection amount. This limits an increase in PN caused by an increase in the synchronous injection amount and properly reduces the asynchronous injection amount so as to reduce the amount of fuel collecting on the intake passage, thereby limiting the generation of PN.

Example 2: In the control device according to Example 1, the operation process executes the multiple injection process on the condition that the temperature of the internal combustion engine is less than or equal to a predetermined temperature and injects the fuel of the requested injection amount with a single fuel injection when the temperature of the internal combustion engine is greater than the predetermined temperature, and the single fuel injection starts injecting at a timing that is more advanced than an open timing of the intake valve.

In the above-described configuration, when the temperature of the internal combustion engine exceeds the predetermined temperature, the multiple injection process is not executed. Accordingly, as compared to when, for example, the multiple injection process is continued, the frequency of driving the port injection valve is reduced. This delays the progress of deterioration of the port injection valve. Thus, when the predetermined temperature is set to be greater than or equal to the upper limit value of the temperature at which the generation of PM is noticeable when only the asynchronous injection is executed, the generation of PM and the deterioration of the port injection valve are both limited.

Example 3: In the control device according to Example 1, the operation process includes a process for executing the multiple injection process on the condition that the load is greater than or equal to a predetermined value and injecting the fuel of the requested injection amount with a single fuel injection when the load is less than the predetermined value, and the single fuel injection starts injecting at a timing that is more advanced than an open timing of the intake valve.

The port injection valve includes a minimum injection amount that enables fuel injection. Thus, when the predetermined value is set to be greater than or equal to the lower limit value at which the predetermined value does not become less than or equal to the minimum injection amount even if the requested injection amount is split, the execution of the multiple injection process prevents the predetermined value from becoming less than or equal to the minimum injection amount. Additionally, PN tends to increase as the load becomes high to a certain extent. Thus, when the predetermined value is set to be less than the lower limit value at which PN increases, the generation of PM does not become noticeable.

Example 4: In the control device according to any one of Examples 1 to 3, the control device is further configured to execute a variably setting process for variably setting an injection start timing of the intake asynchronous injection based on the temperature of the internal combustion engine, and a difference in the injection start timing of the intake asynchronous injection between when the temperature of the internal combustion engine is a first temperature and when the temperature is a second temperature is greater than a difference in an injection start timing of the intake synchronous injection between when the temperature is the first temperature and when the temperature is the second temperature, the second temperature being higher than the first temperature.

The inventor found out that it is particularly important to adapt the injection start timing of the intake synchronous injection in order to reduce PN using the multiple injection process. When the multiple injection is executed, the time interval between the injection end timing of the asynchronous injection and the injection start timing of the intake synchronous injection needs to be greater than or equal to a predetermined time interval because of the structure of the port injection valve. The asynchronous injection amount tends to increase as the temperature of the internal combustion engine decreases. Thus, to set a suitable value for the start timing of the intake synchronous injection, the start timing of the asynchronous injection needs to be greatly varied depending on the temperature of the internal combustion engine by, for example, setting the injection start timing of the asynchronous injection to be more advanced when the temperature of the internal combustion engine is low than when the temperature of the internal combustion engine is high. Accordingly, in the above-described configuration, the above-described difference between the injection start timings of the asynchronous injection is set to be large.

Example 5: In the control device according to any one of Examples 1 to 4, the operation process includes a process for calculating, when starting the internal combustion engine, the synchronous injection amount and the asynchronous injection amount based on the temperature of the internal combustion engine regardless of the air amount filling the cylinder and a process for injecting fuel of the asynchronous injection amount with the intake asynchronous injection and then injecting fuel of the synchronous injection amount with the intake synchronous injection. The control device further executes, when starting the internal combustion engine, a variably setting process for variably setting an injection start timing of the intake asynchronous injection based on the temperature of the internal combustion engine.

At the start time, it is difficult to precisely calculate the requested injection amount based on the filling air amount. In the above-described configuration, the synchronous injection amount and the asynchronous injection amount are calculated based on the temperature of the internal combustion engine. When the multiple injection is executed, the time interval between the injection end timing of the asynchronous injection and the injection start timing of the intake synchronous injection needs to be greater than or equal to a predetermined time interval because of the structure of the port injection valve. The asynchronous injection amount tends to increase as the temperature of the internal combustion engine decreases. Accordingly, in the above-described configuration, the injection start timing of the intake asynchronous injection is variably set based on the temperature of the internal combustion engine. Therefore, even if the asynchronous injection amount varies depending on the temperature, the above-described time interval can be properly obtained.

Example 6: The control device according to any one of Examples 1 to 5 is configured to execute a base injection amount calculation process for calculating a base injection amount that is proportional to the air amount filling the cylinder of the internal combustion engine, a synchronous injection amount calculation process for calculating the synchronous injection amount in accordance with the filling air amount and the temperature of an intake system of the internal combustion engine, a correction process including at least one of two processes that are a transient correction process and an increase correction process, the transient correction process correcting the base injection amount with a transient correction amount when the filling air amount changes, the increase correction process correcting the base injection amount with an increase correction ratio that is larger when the temperature of the intake system is low than when the temperature of the intake system is high, and an asynchronous injection amount calculation process for calculating the asynchronous injection amount based on a value obtained by subtracting the synchronous injection amount from the base injection amount corrected by the correction process.

If the fuel injected from the port injection valve is all injected with the intake asynchronous injection when the temperature of the intake system of the internal combustion engine is low, the number (PN) of particulate matter (PM) in exhaust gas may increase depending on the load. This is because when the amount of fuel collecting on the intake system increases, shearing the collected fuel presumably causes some of the collected fuel to flow into the combustion chamber in a state in which they remain droplets, thereby generating PM. In the above-described configuration, some of the fuel injected from the port injection valve is injected using the synchronous injection. This reduces the asynchronous injection amount and consequently reduces the amount of fuel collecting on the intake system. This prevents situations in which shearing the collected fuel causes the fuel to flow into the combustion chamber in a state in which the fuel remains droplets.

The inventor found out that a suitable synchronous injection amount for reducing PN changes depending on the filling air amount and the temperature of the intake system. PN is affected by the charging efficiency. This is presumably because the filling air amount is determined in accordance with the charging efficiency and the pressure in the intake passage is determined in accordance with the filling air amount. Further, PN is affected by the temperature of the intake system. This is presumably because the temperature of the intake system varies how easily fuel can be atomized. In the above-described configuration, the synchronous injection amount is calculated based on the filling air amount and the temperature of the intake system. Thus, a suitable synchronous injection amount for reducing PN can be calculated.

The inventor considered the multiple injection process for injecting some of the fuel injected from the port injection valve using the intake synchronous injection for injecting in synchronization with the open period of the intake valve instead of injecting all the fuel injected from the port injection valve using the intake asynchronous injection prior to the intake stroke in order to reduce PN, which is the number of particulate matter (PM) in exhaust gas. Then, the inventor found out it is particularly important to set the synchronous injection amount, which is the injection amount of the intake synchronous injection. The above-described configuration corresponds to such a consideration.

Example 7: In the control device according to Example 6, the correction process includes the increase correction process, and the increase correction process includes a process for making the increase correction ratio larger when pressure of a fluid in the intake passage to which fuel is added by the port injection valve is high than when the pressure is low even if the temperature of the intake system is the same.

It is harder to atomize fuel when the pressure of fluid in the intake passage is high than when the pressure of the fluid is low. Thus, the proportion of a fuel amount subject to actual combustion in the combustion chamber tends to be small in the base injection amount. In the above-described configuration, the increase correction ratio is set in accordance with the pressure of fluid in the intake passage. Thus, as compared to when, for example, the increase correction ratio is set without using the pressure, the air-fuel ratio of air-fuel mixture subject to combustion in the combustion chamber can be controlled highly precisely using a target value.

Example 8: In the control device according to Example 6 or 7, the internal combustion engine includes a valve actuation variable device configured to vary a valve actuation of the intake valve, the control device is further configured to execute a valve actuation controlling process for variably controlling an opening start timing of the intake valve by operating the valve actuation variable device, and the synchronous injection amount calculation process is a process for calculating the synchronous injection amount in accordance with the opening start timing of the intake valve in addition to the filling air amount and the temperature of the intake system.

When, for example, the opening start timing of the intake valve becomes retarded to result in the overlap period, in which the intake valve and the exhaust valve are both open, the air-fuel mixture burned in the combustion chamber is blown back into the intake passage. The amount to be blown back depends on the length of the overlap period. Since the temperature of the intake system increases in accordance with the amount to be blown back, a change occurs in how easily fuel can be atomized. Thus, the opening start timing of the intake valve serves as a parameter that changes a suitable synchronous injection amount for reducing PN. In the above-described configuration, the synchronous injection amount is calculated in accordance with the opening start timing. Accordingly, as compared to when, for example, the opening start timing is not referenced, PN can be reduced.

Example 9: In the control device according to Example 8, the synchronous injection amount calculation process is a process for calculating the synchronous injection amount in accordance with a rotation speed of a crankshaft of the internal combustion engine in addition to the filling air amount, the temperature of the intake system, and the opening start timing of the intake valve.

As the rotation speed increases, the amount in which the crankshaft rotates until fuel injected from the port injection valve is atomized increases. Thus, atomization cannot be tolerantly performed. Accordingly, the rotation speed serves as a parameter that changes a suitable synchronous injection amount for reducing PN. In the above-described configuration, the synchronous injection amount is calculated in accordance with the rotation speed. Therefore, as compared to when, for example, the rotation speed is not referenced, PN can be reduced.

Example 10: In the control device according to any one of Examples 6 to 9, the internal combustion engine includes an adjustment device that adjusts pressure of fuel supplied to the port injection valve. The control device is further configured to execute a selection process for selecting a single injection process or the multiple injection process, the single injection process injecting, with the intake asynchronous injection, fuel corresponding to the base injection amount corrected through the correction process by operating the port injection valve, the multiple injection process including the intake asynchronous injection and the intake synchronous injection and a fuel pressure varying process for variably controlling the pressure of the fuel by operating the adjustment device. The operation process is a process for executing a process selected by the selection process, and the fuel pressure varying process includes a process for making the pressure of the fuel higher when the multiple injection process is executed than when the single injection process is executed.

Since fuel can be atomized to a larger extent when the pressure injected from the port injection valve is high than when the pressure is low, fuel can be atomized easily. However, the energy consumption amount of the adjustment device increases. To intend to reduce PN using the multiple injection process, fuel atomization can be expedited by increasing the pressure of fuel. This further increases the effect of reducing PN. Thus, the advantage of increasing the pressure of fuel even by increasing the energy consumption amount is large. In contrast, when the single injection process is executed, the multiple injection process, which intends to reduce PN, is not executed. Thus, the advantage of increasing the pressure of fuel even by increasing the energy consumption amount is small. Accordingly, in the above-described configuration, the pressure is set to be higher in the multiple injection process than in the single injection process. Therefore, when the advantage of expediting atomization by increasing the pressure becomes noticeable, the pressure can be increased.

Example 11: A control device for an internal combustion engine is provided. The internal combustion engine to which the control device is applied includes a port injection valve that injects fuel into an intake passage. The control device is configured to execute a base injection amount calculation process for calculating a base injection amount that is proportional to an air amount filling a cylinder of the internal combustion engine, a synchronous injection amount calculation process for calculating a synchronous injection amount in accordance with the filling air amount and a temperature of an intake system of the internal combustion engine, the synchronous injection amount being an injection amount of an intake synchronous injection that injects fuel in synchronization with an open period of an intake valve, a correction process including at least one of two processes that are a transient correction process and an increase correction process, the transient correction process correcting the base injection amount with a transient correction amount when the filling air amount changes, the increase correction process correcting the base injection amount with an increase correction ratio that is larger when the temperature of the intake system is low than when the temperature of the intake system is high, an asynchronous injection amount calculation process for calculating an asynchronous injection amount based on a value obtained by subtracting the synchronous injection amount from the base injection amount corrected by the correction process, the asynchronous injection amount being an injection amount of an intake asynchronous injection that injects fuel at a timing that is more advanced than at a timing of the intake synchronous injection, and an operation process for operating the port injection valve in accordance with the asynchronous injection amount and the synchronous injection amount.

Example 12: A control method for an internal combustion engine that performs the various processes described in Examples 1 to 10 is provided.

Example 13: A control method for an internal combustion engine that performs the various processes described in Example 11 is provided.

Example 14: A non-transitory computer readable memory medium is provided that stores a program that causes a processor to execute the various processes described in Examples 1 to 11.

MODES FOR CARRYING OUT THE INVENTION

A control device for an internal combustion engine according to a first embodiment of the present disclosure will now be described with reference to FIGS. 1 to 9B.

Figure 1:
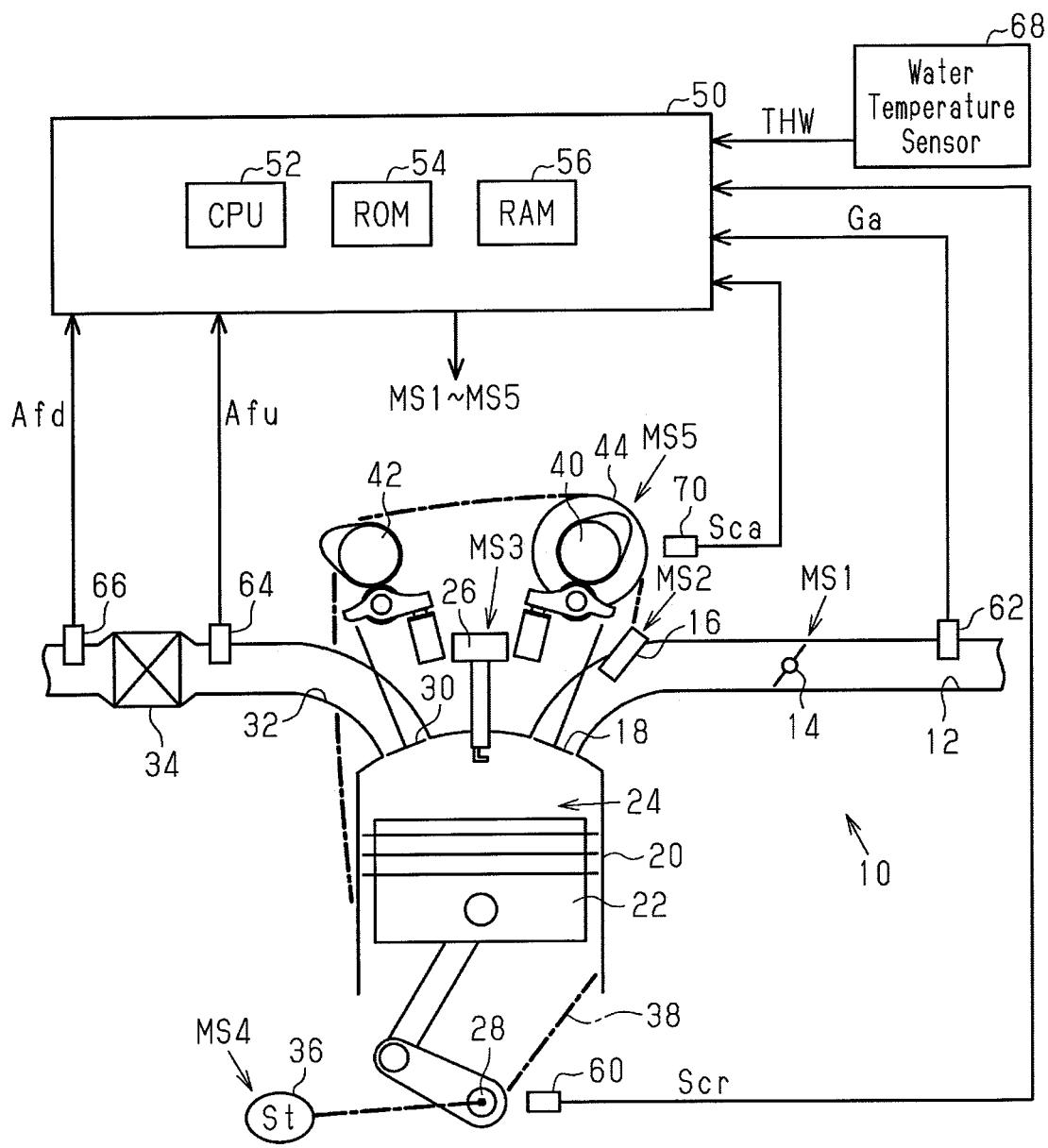
FIG. 1 is a diagram showing a control device and a fuel injection internal combustion engine according to a first embodiment of the present disclosure.

FIG. 1 shows an internal combustion engine 10 with an intake passage 12. The intake passage 12 includes a throttle valve 14. A port injection valve 16 is arranged downstream of the throttle valve 14. The air drawn into the intake passage 12 and the fuel injected from the port injection valve 16 flow into a combustion chamber 24, which is defined by a cylinder 20 and a piston 22, as an intake valve 18 opens. The air-fuel mixture is burned by spark discharge of an ignition device 26 in the combustion chamber 24, and the energy generated by the combustion is converted into rotation energy of a crankshaft 28 by the piston 22. The burned air-fuel mixture is discharged to an exhaust passage 32 as exhaust gas when an exhaust valve 30 opens. The exhaust passage 32 includes a catalyst 34.

A starter motor 36, which gives initial rotation to the crankshaft 28, is mechanically connected to the crankshaft 28. Further, the rotation power of the crankshaft 28 is transmitted through a timing chain 38 to an intake camshaft 40 and an exhaust camshaft 42. In the present embodiment, the power of the timing chain 38 is transmitted to the intake camshaft 40 through an intake valve timing adjustment device 44. The intake valve timing adjustment device 44 is an actuator that adjusts the valve-opening timing of the intake valve 18 by adjusting the rotation phase difference between the crankshaft 28 and the intake camshaft 40.

The control device 50 controls the internal combustion engine 10. In order to control the control amount (for example, torque or exhaust component) of the internal combustion engine 10, the control device 50 operates the throttle valve 14, operation units of the internal combustion engine 10 such as the port injection valve 16, the ignition device 26, and the intake valve timing adjustment device 44, and the starter motor 36. The control device 50 refers to an output signal Scr of a crank angle sensor 60, an intake air amount Ga, which is detected by an airflow meter 62, an upstream air-fuel ratio Afu, which is detected by an upstream air-fuel ratio sensor 64 arranged upstream of the catalyst 34, and a downstream air-fuel ratio Afd, which is detected by a downstream air-fuel ratio sensor 66 arranged downstream of the catalyst 34. Further, the control device 50 refers to the temperature of the coolant (coolant temperature THW) of the internal combustion engine 10, which is detected by a water temperature sensor 68, and an output signal Sca of an intake cam angle sensor 70.

The control device 50 includes a CPU 52, a ROM 54, and a RAM 56 and controls the above-described control amount by the CPU 52 executing programs stored in the ROM 54.

Figure 2:
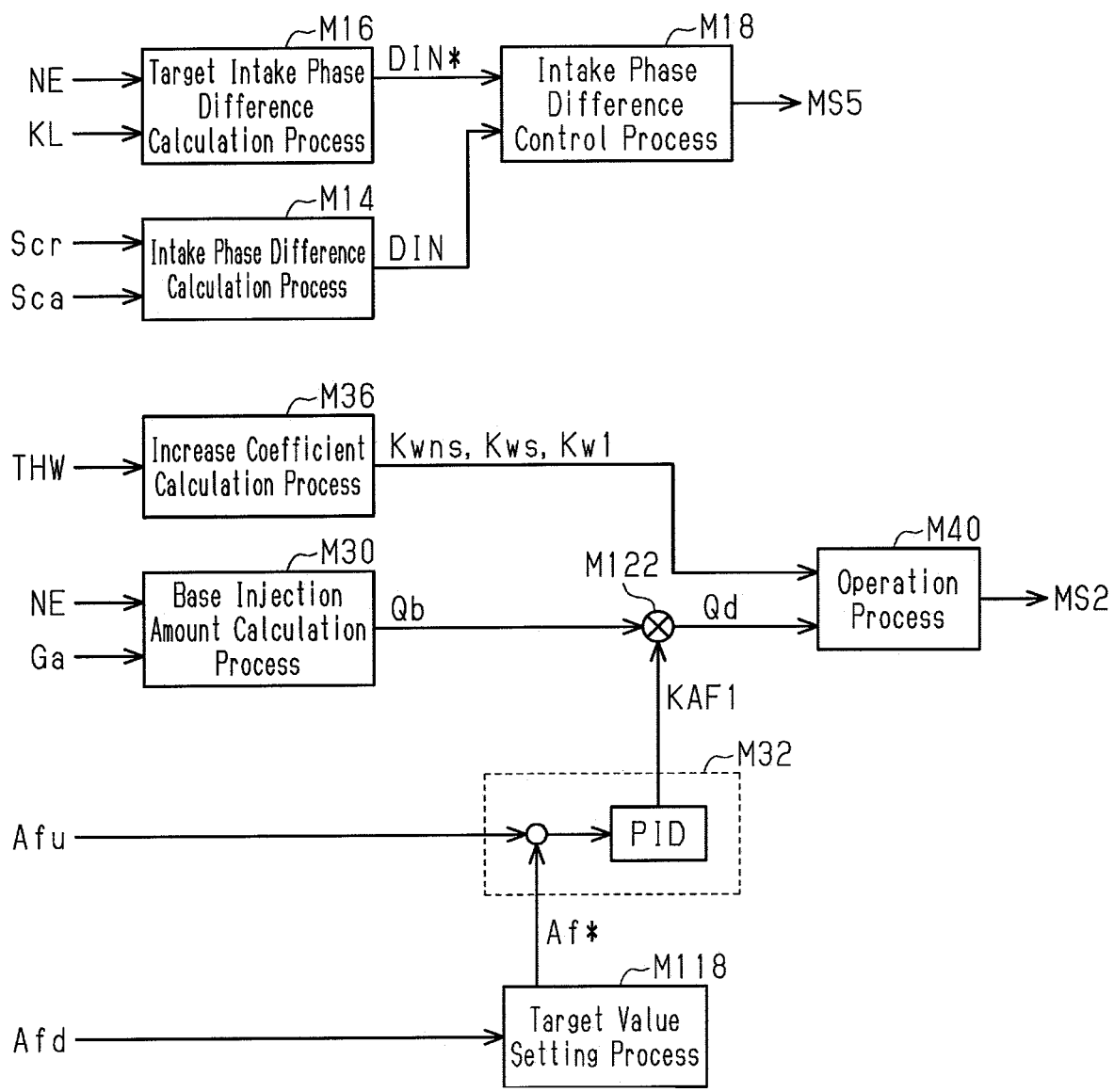
FIG. 2 is a block diagram showing part of processes executed by the control device in the internal combustion engine of FIG. 1.

FIG. 2 shows part of processes executed by control device 50. The processes (processors) shown in FIG. 2 are implemented by the CPU 52 executing the programs stored in the ROM 54.

An intake phase difference calculation process M14 calculates an intake phase difference DIN, which is a phase difference of the rotation angle of the intake camshaft 40 relative to the rotation angle of the crankshaft 28, based on the output signal Scr of the crank angle sensor 60 and the output signal Sca of the intake cam angle sensor 70. A target intake phase difference calculation process M16 variably sets a target intake phase difference DIN* based on the operating point of the internal combustion engine 10. In the present embodiment, the operation point is defined by a rotation speed NE and a load factor KL. The CPU 52 calculates the rotation speed NE based on the output signal Scr of the crank angle sensor 60 and calculates the load factor KL based on the rotation speed NE and the intake air amount Ga. The load factor KL is the ratio of the inflow air amount per combustion cycle of one cylinder to a reference inflow air amount. The reference inflow air amount is an inflow air amount per combustion cycle of one cylinder when the open degree of the throttle valve 14 is the maximum. The reference inflow air amount may be variably set in accordance with the rotational speed NE.

An intake phase difference control process M18 outputs an operation signal MS5 in order to operate the intake valve timing adjustment device 44 so that the intake phase difference DIN is controlled to the target intake phase difference DIN*.

A base injection amount calculation process M30 calculates a base injection amount Qb based on the rotation speed NE and the intake air amount Ga. The base injection amount Qb is the base value of a fuel amount for setting the air-fuel ratio of the air-fuel mixture in the combustion chamber 24 to a target air-fuel ratio. The rotation speed NE and the intake air amount Ga are parameters used to define an air amount filling the cylinder, and the base injection amount Qb is a fuel amount calculated to control the air-fuel ratio to the target air-fuel ratio based on the air amount filling the cylinder. In the present embodiment, a stoichiometric air-fuel ratio is exemplified as the target air-fuel ratio.

A target value setting process M118 sets a target value Af* for performing feedback control such that the air-fuel mixture of air-fuel mixture in the combustion chamber 24 becomes the target air-fuel ratio with the upstream air-fuel ratio Afu set as a feedback control amount. The target value setting process M118 may slightly change the target value Af* relative to a value used when the upstream air-fuel ratio Afu is the target air-fuel ratio such that an oxygen absorption amount of the catalyst 34 is controlled to a predetermined amount in accordance with the value of the downstream air-fuel ratio Afd. Such a process may be achieved by, for example, correcting the value used when the upstream air-fuel ratio Afu is the target air-fuel ratio using an operation amount for performing feedback control such that the downstream air-fuel ratio Afd becomes a downstream target value.

A feedback process M32 calculates a feedback operation amount KAF1, which is an operation amount used to perform feedback control such that the upstream air-fuel ratio Afu becomes the target value Af*. More specifically, the feedback process M32 sets, as the feedback operation amount KAF1, the sum of the output values of a proportional element, an integral element, and a differential element that include the difference between the upstream air-fuel ratio Afu and the target value Af* as an input.

A correction process M122 calculates a requested injection amount Qd by multiplying the base injection amount Qb by the feedback operation amount KAF1.

An increase coefficient calculation process M36 outputs, as a value larger than 1, an increase coefficient used to make an actual injection amount larger than the requested injection amount Qd when the water temperature THW is less than or equal to a predetermined temperature Tth1 (for example, 60° C.). In the present embodiment, the increase coefficient is set to a value that sufficiently suppresses misfires even if the fuel injected from the port injection valve 16 is heavy fuel. Such a process is to set a value that makes the injection amount larger than when the use of heavy fuel is not assumed.

An injection valve operation process M40 outputs an operation signal MS2 to the port injection valve 16 in order to operate the port injection valve 16 based on the requested injection amount Qd and the output value of the increase coefficient calculation process M36 after a predetermined period has elapsed since the starter motor 36 was activated.

Figure 3:
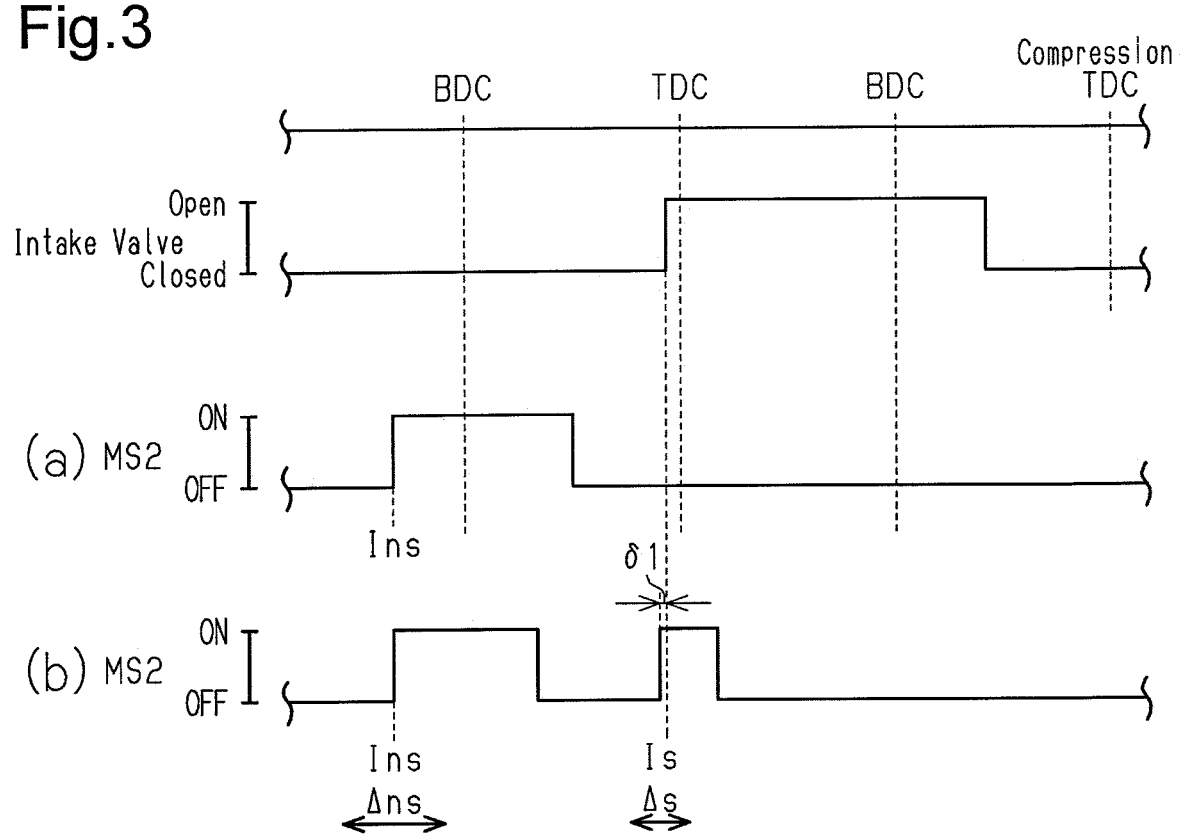
FIG. 3 is a timing diagram illustrating the fuel injection in the internal combustion engine of FIG. 1, including section (a) and section (b) showing two patterns.

In the present embodiment, the patterns of fuel injection include two types of fuel injection processes, namely, a pattern illustrated in section (a) of FIG. 3 and a pattern illustrated in section (b) of FIG. 3.

Section (a) of FIG. 3 shows the pattern of executing a single injection (sole injection) in which fuel injection is started before the intake valve 18 opens. In the single injection, as long as the injection amount does not become excessively large, the injection of fuel is ended before the intake valve 18 opens.

Section (b) of FIG. 3 shows the pattern of a multiple injection process for executing two fuel injections, namely, an intake synchronous injection and an intake asynchronous injection. In the intake synchronous injection, fuel injection is started at an injection start timing Is in synchronization with the open timing of the intake valve 18. In the intake asynchronous injection, fuel injection is started at an injection start timing Ins, which is more advanced than the timing of the intake synchronous injection. The broken line extending over both sections (a) and (b) of FIG. 3 shows the open timing of the intake valve 18. In the present embodiment, the injection start timing Is of the intake synchronous injection is set to be more advanced than the open timing (above-described broken line) of the intake valve 18 by a slight time $\delta 1$. The slight time $\delta 1$ is set to the time required for the fuel injected from the port injection valve 16 to reach the position before the intake valve 18 opens. Such a process is to cause the injected fuel to flow into the combustion chamber 24 as early as possible when the intake valve 18 opens. The pattern shown in section (a) of FIG. 3 is a pattern for executing only the intake asynchronous injection. Thus, the injection start timing is described as the injection start timing Ins.

The injection valve operation process M40 operates the port injection valve 16 regardless of the requested injection amount Qd within a predetermined period after the starter motor 36 was activated. The predetermined period refers to a period during which the requested injection amount Qd cannot be properly calculated immediately after the starter motor 36 applies initial rotation to the crankshaft 28. In the present embodiment, the multiple injection process is executed even during the predetermined period.

Figure 4:
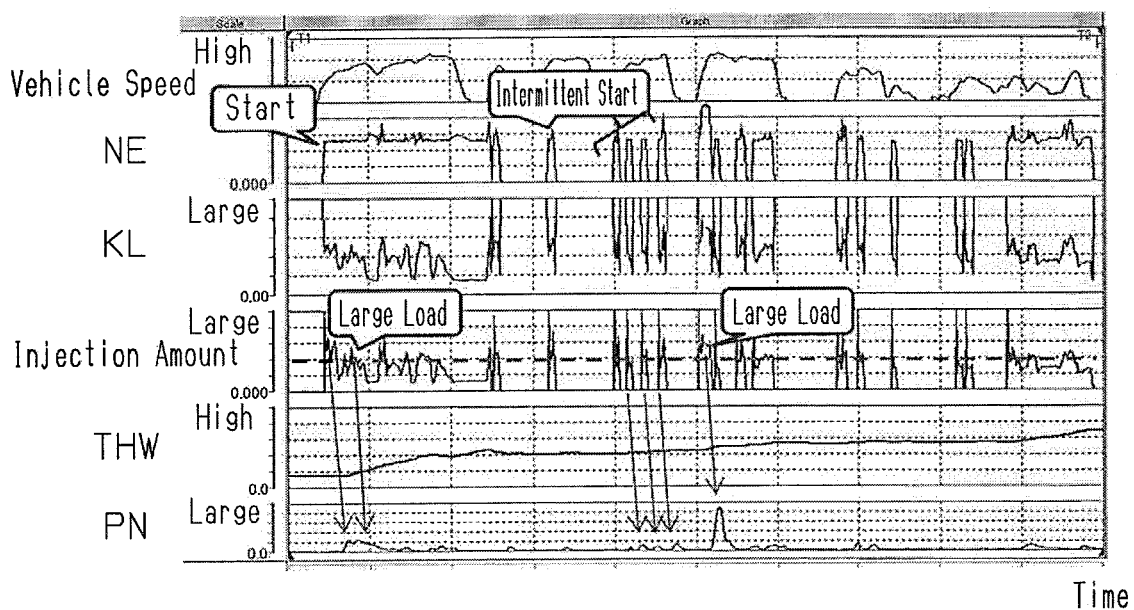
FIG. 4 is a timing diagram showing a problem to be solved by the embodiment in the internal combustion engine of FIG. 1.

In the present embodiment, the multiple injection process is executed with the intention of reducing PN. FIG. 4 shows changes in the vehicle speed, the rotation speed NE, the load factor KL, the injection amount, the water temperature THW, and PN that occur when the intake asynchronous injection illustrated in section (a) of FIG. 3 is executed.

As shown in FIG. 4, PN increases in a region the water temperature THW is low to a certain extent and the load factor KL is high to a certain extent at the start time.

A fuel injection control of the internal combustion engine 10 of the present embodiment with the intention of reducing PN will now be described.

Figure 5:
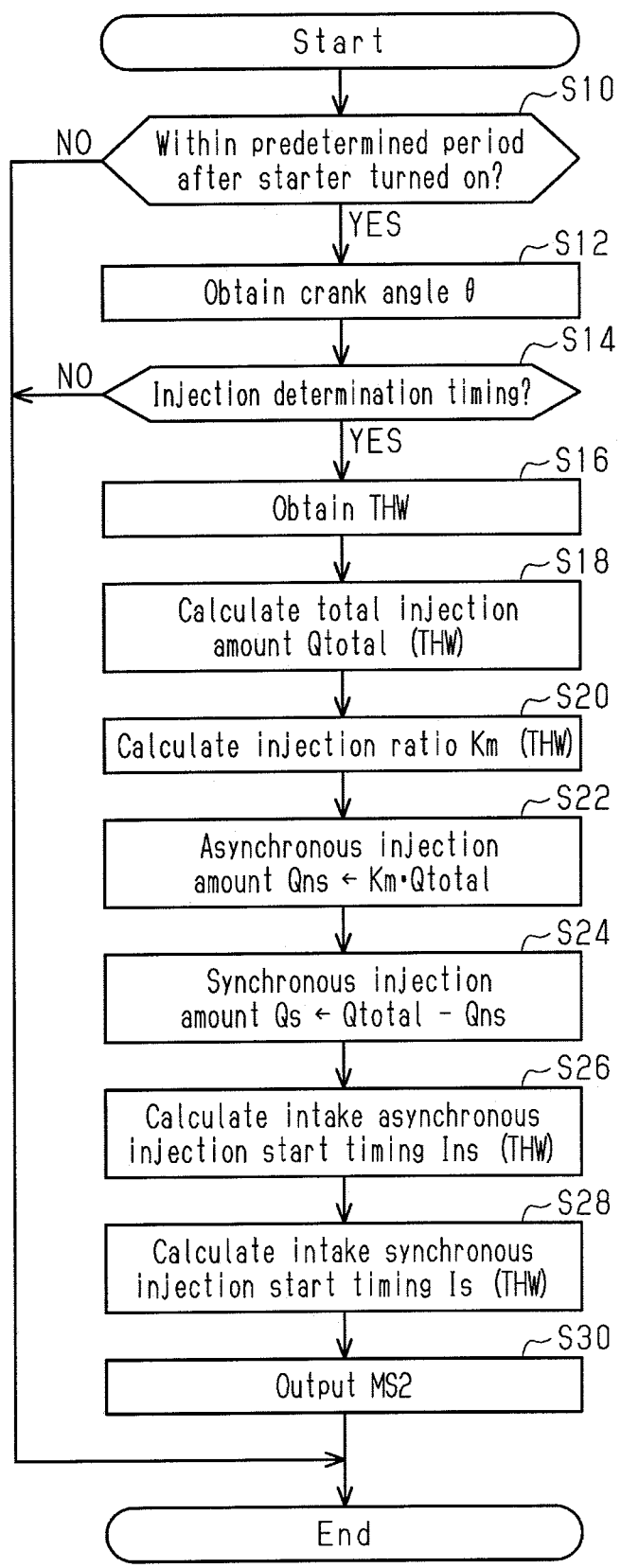
FIG. 5 is a flowchart illustrating a procedure for processes related to fuel injection immediately after the starter is turned on in the internal combustion engine of FIG. 1.

FIG. 5 shows a procedure for processes when the internal combustion engine 10 is started. The processes shown in FIG. 5 are executed by the CPU 52 repeatedly executing programs stored in the ROM 54, for example, at a predetermined interval. In the following description, the number of each step is represented by the letter S followed by a numeral.

In a series of processes illustrated in FIG. 5, the CPU 52 first determines whether the current time is within a predetermined period after the starter motor 36 was started (S10). The predetermined period refers to a period in which the amount of air filling the combustion chamber 24 cannot be obtained accurately and thus the requested injection amount Qd cannot be calculated accurately. When determining that the current time is within the predetermined period after the starter motor 36 was started (S10: YES), the CPU 52 obtains a crank angle $\theta$, which is calculated from the output signal Scr of the crank angle sensor 60 (S12). Then, the CPU 52 determines whether the current timing is a timing for determining the injection amount based on the crank angle $\theta$ (S14). The timing for determining the injection amount is once set for a single combustion cycle per cylinder. When determining that the current timing is the timing for determining the injection amount (S14: YES), the CPU 52 obtains the water temperature THW (S16). Next, based on the water temperature THW, the CPU 52 calculates a total injection amount Qtotal, which is the total of fuel amounts injected from the intake asynchronous injection and the intake synchronous injection (S18). The total injection amount Qtotal is larger when the water temperature THW is low than when the water temperature THW is high. Such a process simply needs to be achieved by, for example, storing in the ROM 54 map data that includes the water temperature THW as an input variable and the total injection amount Qtotal as an output variable and performing map calculation for the total injection amount Qtotal by the CPU 52. The map data refers to a data set of discrete values of input variables and values of output variables each corresponding to a value of the input variables. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

Subsequently, the CPU 52 sets an injection ratio Km of the intake asynchronous injection to the intake synchronous injection in accordance with the water temperature THW (S20). Such a process simply needs to be achieved by, for example, storing in the ROM 54 map data that includes the water temperature THW as an input variable and the injection ratio Km as an output variable and performing map calculation for the injection ratio Km by the CPU 52. Then, the CPU 52 substitutes, into an asynchronous injection amount Qns, a value obtained by multiplying the total injection amount Qtotal by the injection ratio Km. The asynchronous injection amount Qns is the injection amount of the intake asynchronous injection (S22). Next, the CPU 52 substitutes, into a synchronous injection amount Qs, a value obtained by subtracting the asynchronous injection amount Qns from the total injection amount Qtotal. The synchronous injection amount Qs is the injection amount of the intake synchronous injection (S24).

Subsequently, the CPU 52 calculates the injection start timing Ins of the intake asynchronous injection based on the water temperature THW (S26). Such a process simply needs to be achieved by, for example, storing in the ROM 54 map data that includes the water temperature THW as an input variable and the injection start timing Ins as an output variable and performing map calculation for the injection start timing Ins by the CPU 52.

Then, the CPU 52 calculates the injection start timing Is of the intake synchronous injection based on the water temperature THW (S28). Such a process simply needs to be achieved by, for example, storing in the ROM 54 map data that includes the water temperature THW as an input variable and the injection start timing Is as an output variable and performing map calculation for the injection start timing Is by the CPU 52.

Then, the CPU 52 outputs an operation signal MS2 to inject fuel corresponding to the asynchronous injection amount Qns at the injection start timing Ins and outputs the operation signal MS2 to inject fuel corresponding to the synchronous injection amount Qs at the injection start timing Is.

When completing the process of S30 or when making a negative determination in the process of S10 or S14, the CPU 52 temporarily ends the series of processes shown in FIG. 5.

Figure 6:
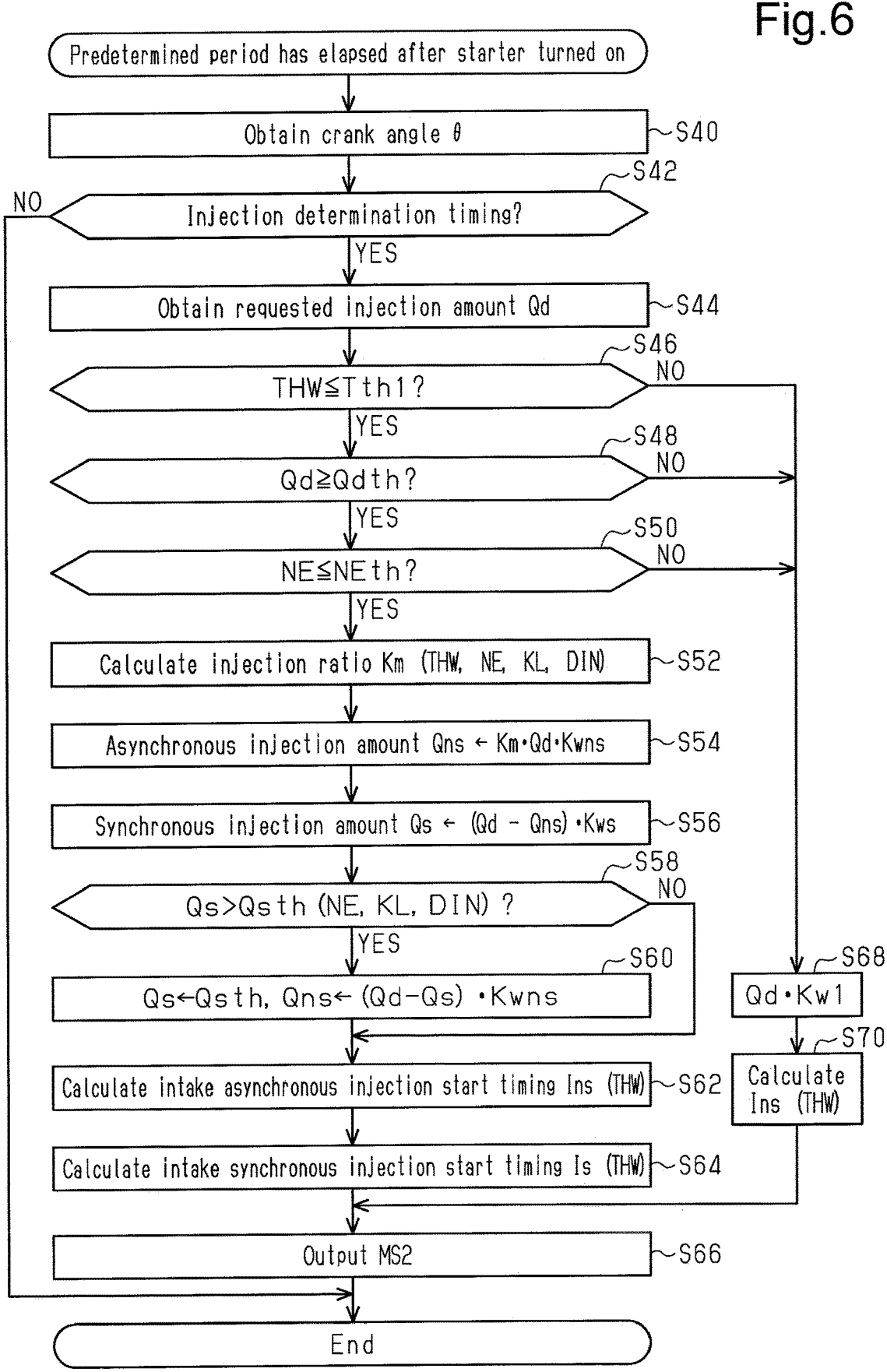
FIG. 6 is a flowchart illustrating a procedure for processes related to fuel injection after a predetermined period has elapsed since the starter was turned on in the internal combustion engine of FIG. 1.

FIG. 6 shows a procedure for processes executed after the predetermined period has elapsed after the starter motor 36 was activated. The processes shown in FIG. 6 are executed by the CPU 52 repeatedly executing programs stored in the ROM 54, for example, at the predetermined interval after the predetermined period has elapsed.

In a series of processes shown in FIG. 6, the CPU 52 obtains the crank angle θ in the same manner as the processes of S12 and S14 in FIG. 5 (S40) and determines whether the current timing is a pattern for determining whether to employ the pattern illustrated in section (a) of FIG. 3 or the pattern illustrated in section (b) of FIG. 3 (S42). When determining that the current timing is the timing for determining the pattern (S42: YES), the CPU 52 obtains the requested injection amount Qd (S44). Next, the CPU 52 determines whether the water temperature THW is less than or equal to a predetermined temperature Tth1 (S46). This process is a process for determining whether one of the conditions for executing the multiple injection process is satisfied. That is, as shown in FIG. 4, the generation of PM is noticeable when the water temperature THW is low. Thus, the water temperature THW being the predetermined temperature Tth1 is one of the conditions for executing the multiple injection process.

When determining that the water temperature THW is less than or equal to the predetermined temperature Tth1 (S46: YES), the CPU 52 determines whether the requested injection amount Qd is greater than or equal to a predetermined value Qdth (S48). This process is a process for determining whether one of the conditions for executing the multiple injection process is satisfied. That is, the port injection valve 16 includes a minimum injection amount that enables fuel injection. Thus, when the requested injection amount Qd is excessively small, splitting the requested injection amount Qd to perform the multiple injection process may cause the asynchronous injection amount Qns and the synchronous injection amount Qs to fall below the minimum injection amount. Accordingly, in the present embodiment, the predetermined value Qdth is set to be greater than or equal to the lower limit value of the injection amount at which the asynchronous injection amount Qns and the synchronous injection amount Qs are the minimum injection amounts even when the multiple injection process is executed.

When determining that the requested injection amount Qd is greater than or equal to the predetermined value Qdth (S48: YES), the CPU 52 determines whether the rotation speed NE is less than or equal to a predetermined speed NEth (S50). This process is a process for determining whether one of the conditions for executing the multiple injection process is satisfied. Such a process is performed in view of the fact that since the time required for the rotation of a unit crank angle decreases as the rotation speed NE increases, when the rotation speed NE is excessively large, the fuel of the requested injection amount Qd may not be able to be injected through the multiple injection within the time required for the rotation of a predetermined crank angle region. The above-described predetermined speed NEth is set to be less than the lower limit speed at which the fuel of the requested injection amount Qd may not be able to be injected through the multiple injection within the time required for the rotation of the predetermined crank angle region.

Figure 7A:
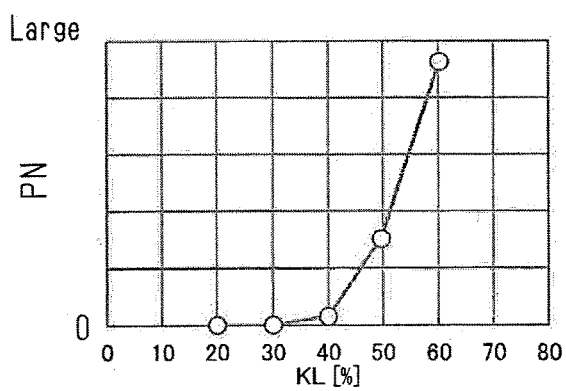
FIG. 7A is a graph showing the relationship between a load factor and PN in the internal combustion engine of FIG. 1.
Figure 7B:
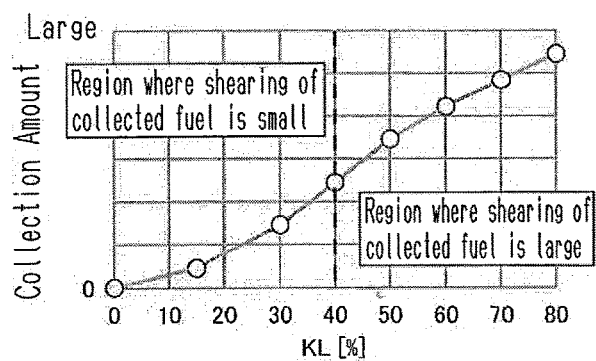
FIG. 7B is a graph showing the relationship between the load factor and the amount of fuel collecting on an inner wall surface of the intake passage in the internal combustion engine of FIG. 1.

When determining that the rotation speed NE is less than or equal to the predetermined speed NEth (S50: YES), the CPU 52 calculates the ratio (injection ratio Km) of the asynchronous injection amount Qns to the synchronous injection amount Qs based on the water temperature THW, the rotation speed NE, the load factor KL, and the intake phase difference DIN (S52). The load factor KL is a parameter having a strong correlation with PN. FIG. 7A shows the relationship between the load factor KL and PN, and FIG. 7B shows the relationship between the load factor KL and the amount of fuel collecting on the intake passage 12. As shown in FIG. 7B, the amount of fuel collecting on the intake passage 12 increases as the load factor KL increases. As shown in FIG. 7A, PN exponentially increases when the load factor KL becomes greater than or equal to a predetermined value. This is presumably because when the amount of fuel collecting on the intake passage 12 increases to a certain extent, shearing the collected fuel causes some of the collected fuel to flow into the combustion chamber 24 in a state in which they remain droplets. The inventor has found out that whereas the amount of fuel collecting on the intake passage 12 is reduced by reducing the asynchronous injection amount Qns, PN increases when the synchronous injection amount Qs is excessively increased. Thus, an optimal injection ratio Km is adapted in accordance with the load factor KL.

The amount of fuel collecting on the intake passage 12 depends not only on the load factor KL but also on the water temperature THW. In particular, the collection amount is larger when the water temperature THW is low than when the water temperature THW is high. The water temperature THW is a parameter having a strong correlation with the collection amount. Thus, in the present embodiment, the injection ratio Km is adapted in accordance with the water temperature THW in addition to the load factor KL. Further, the collection amount depends on the rotation speed NE and the intake phase difference DIN. Accordingly, in the present embodiment, the injection ratio Km is adapted in accordance with the rotation speed NE and the intake phase difference DIN in addition to the load factor KL and the water temperature THW.

More specifically, map data including the load factor KL, the water temperature THW, the rotation speed NE, and the intake phase difference DIN as input variables and including the injection ratio Km as an output variable simply needs to be stored in the ROM 54, and map calculation for the injection ratio Km simply needs to be performed by the CPU 52.

Next, the CPU 52 substitutes, into the asynchronous injection amount Qns, a value obtained by multiplying the requested injection amount Qd by the injection ratio Km and an asynchronous increase coefficient Kwns, which is output by the increase coefficient calculation process M36 (S54). The asynchronous increase coefficient Kwns has a value greater than or equal to 1. When the water temperature THW is less than or equal to the predetermined temperature Tth1, the asynchronous increase coefficient Kwns is a value greater than 1 and a value that becomes larger as the water temperature THW becomes lower. Such a process is performed in view of the fact that the amount of fuel in the injected fuel that does not contribute to burning increases when the temperature of the internal combustion engine 10 is low.

Subsequently, the CPU 52 substitutes, into the synchronous injection amount Qs, a value obtained by subtracting the asynchronous injection amount Qns calculated through the process of S54 from the requested injection amount Qd and then multiplying that value by a synchronous increase coefficient Kws (S56). The synchronous increase coefficient Kws is output by the increase coefficient calculation process M36. In the same manner as the asynchronous increase coefficient Kwns, the synchronous increase coefficient Kws is a value greater than or equal to 1. When the water temperature THW is less than or equal to the predetermined temperature Tth1, the synchronous increase coefficient Kws is a value that is greater than 1 and becomes larger as the water temperature THW becomes lower. In the present embodiment, the synchronous increase coefficient Kws is less than or equal to the asynchronous increase coefficient Kwns.

Then, the CPU 52 determines whether the synchronous injection amount Qs calculated through the process of S56 exceeds a synchronous upper limit value Qsth (S58). This process is a process for determining whether an increase in the synchronous injection amount Qs increases the amount of fuel collecting in the cylinder and consequently increases the generation of PN and HC. The CPU 52 variably sets the synchronous upper limit value Qsth in accordance with the rotation speed NE, the load factor KL, and the intake phase difference DIN. Such a process simply needs to be achieved by, for example, storing in the ROM 54 map data that includes the rotation speed NE, the load factor KL, and the intake phase difference DIN as input variables and the synchronous upper limit value Qsth as an output variable and performing map calculation for the synchronous upper limit value Qsth by the CPU 52.

When determining that the synchronous injection amount Qs exceeds the synchronous upper limit value Qsth (S58: YES), the CPU 52 substitutes the synchronous upper limit value Qsth into the synchronous injection amount Qs and then substitutes, into the asynchronous injection amount Qns, a value obtained by multiplying the asynchronous increase coefficient Kwns by a value obtained by subtracting the synchronous injection amount Qs from the requested injection amount Qd (S60).

When completing the process of S60 or when making a negative determination in the process of S58, the CPU 52 calculates the injection start timing Ins of the intake asynchronous injection in accordance with the water temperature THW (S62). Such a process simply needs to be achieved by, for example, storing in the ROM 54 map data that includes the water temperature THW as an input variable and the injection start timing Ins as an output variable and performing map calculation for the injection start timing Ins by the CPU 52.

Then, the CPU 52 calculates the injection start timing Is of the intake synchronous injection based on the water temperature THW (S64). Such a process simply needs to be achieved by, for example, storing in the ROM 54 map data that includes the water temperature THW as an input variable and the injection start timing Is as an output variable and performing map calculation for the injection start timing Is by the CPU 52.

FIG. 3 shows the difference Δns in the injection start timings Ins between when the water temperature THW is a hypothetical minimum value (first temperature) and when the water temperature THW is the predetermined temperature Tth1 (second temperature). FIG. 3 also shows the difference Δs in the injection start timing Is between when the water temperature THW is the hypothetical minimum value and when the water temperature THW is the predetermined temperature Tth1. As shown in FIG. 3, in the present embodiment, the difference Δns between the injection start timings Ins of the intake asynchronous injection is larger than the difference Δs between the injection start timings Is of the intake synchronous injection. Such a process is performed in view of the fact that the setting of the injection start timing Is of the intake synchronous injection sensitively reacts with exhaust components.

Figure 8A:
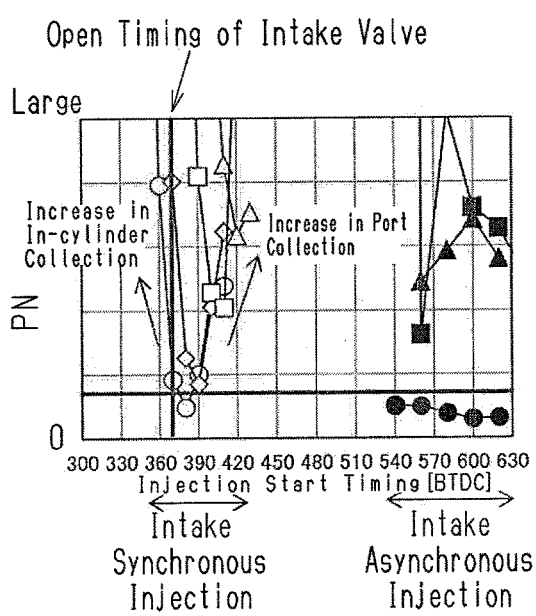
FIG. 8A is a graph showing the relationship between an injection start timing of a multiple injection process and the generation amount of PN in the internal combustion engine of FIG. 1.
Figure 8B:
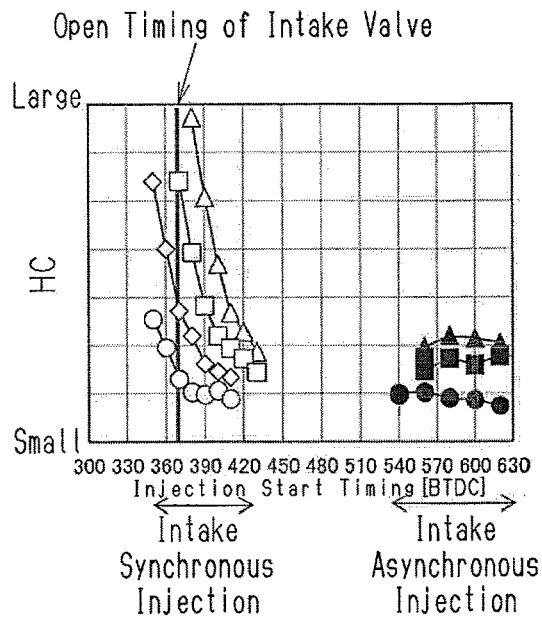
FIG. 8B is a graph showing the relationship between the injection start timing of the multiple injection process and the generation amount of HC in the internal combustion engine of FIG. 1.

FIG. 8A shows PN generated when the injection start timings Ins and Is are changed, and FIG. 8B shows the amount of HC generated when the injection start timings Ins and Is are changed. In these graphs, the white plots indicate generation amounts in which when the injection start timing Ins of the intake asynchronous injection is fixed and the injection start timing Is of the intake synchronous injection is changed, and the black plots indicate generation amounts in which when the injection start timing Is of the intake synchronous injection is fixed and the injection start timing Ins of the intake asynchronous injection is changed. The circle plots, the rhombus plots, the square plots, and the triangular plots respectively correspond to 8:2, 7:3, 6:4, and 5:5 in the ratio of the asynchronous injection amount Qns to the synchronous injection amount Qs.

As shown in FIGS. 8A and 8B, when the ratio of the synchronous injection amount Qs is high, decreases in the generation amounts of PN and HC are limited. Further, as shown in FIGS. 8A and 8B, when the ratio of the synchronous injection amount Qs is reduced to a certain extent, a change in the injection start timing Is of the synchronous injection greatly changes the generation amounts of PN and HC. Thus, in the present embodiment, the injection start timing Is of the synchronous injection is set to a suitable value that reduces the generation amounts of PN and HC. The injection start timing Ins of the asynchronous injection is set such that the interval from the injection end timing of the asynchronous injection to the injection start timing Is of the synchronous injection is greater than or equal to a value required for the structure of the port injection valve 16. As the water temperature THW decreases, the asynchronous increase coefficient Kwns increases and thus the injection time of the asynchronous injection increases. Thus, in order to ensure the interval from the injection end timing of the asynchronous injection to the injection start timing Is of the synchronous injection, the injection start timing Ins of the asynchronous injection needs to be greatly varied in accordance with the water temperature THW by setting the injection start timing Ins of the asynchronous injection to be more advanced when, for example, the water temperature THW is low than when the water temperature THW is high.

Referring back to FIG. 6, the CPU 52 outputs the operation signal MS2 to start injecting fuel corresponding to the asynchronous injection amount Qns at the injection start timing Ins and outputs the operation signal MS2 to start injecting fuel in correspondence with the synchronous injection amount Qs at the injection start timing Is (S66).

When making a negative determination in any one of the processes S46, S48, and S50, the CPU 52 calculates, as the injection amount of fuel injection in section (a) of FIG. 3, a value obtained by multiplying the requested injection amount Qd by an increase coefficient Kw1 (S68). The increase coefficient Kw1 is output by the increase coefficient calculation process M36. In the same manner as the asynchronous increase coefficient Kwns, the increase coefficient Kw1 is a value greater than or equal to 1. When the water temperature THW is less than or equal to the predetermined temperature Tth1, the increase coefficient Kw1 is a value that is greater than 1 and becomes larger as the water temperature THW becomes lower. Then, the CPU 52 calculates the injection start timing Ins shown in section (a) in FIG. 3 in accordance with the water temperature THW (S70). Then, at the injection start timing Ins, the CPU 52 outputs the operation signal MS2 to start fuel injection corresponding to the injection amount calculated in the process of S68 (S66).

When completing the process of S66 or when making a negative determination in the process of S42, the CPU 52 temporarily ends the series of processes shown in FIG. 6.

The operation of the present embodiment will now be described.

When the amount of fuel collecting on the intake passage 12 easily increases because of a low water temperature THW, the multiple injection process including the intake asynchronous injection and the intake synchronous injection are basically executed. Further, the injection ratio Km is variably set in accordance with the load factor KL. This favorably limits situations in which an increase in the injection amount of the intake asynchronous injection increases the fuel collecting on the intake passage 12 and thus increases PN. This also favorably limits situations in which an increase in the synchronous injection amount Qs increases PN. When the multiple injection process is performed, the reduction amount of the injection amount of the intake asynchronous injection is larger than the amount allocated to the injection amount of the synchronous injection in the requested injection amount Qd. This is because the asynchronous injection amount Qns is a value obtained by multiplying the asynchronous increase coefficient Kwns by the injection amount allocated to the asynchronous injection in the requested injection amount Qd. Thus, when the multiple injection process is executed, an increase in the injection amount by the asynchronous increase coefficient Kwns, which is set tolerantly such that misfires do not occur in the case of heavy fuel, is even reduced from the injection amount of the intake asynchronous injection. Consequently, the amount of fuel collecting on the intake passage 12 is further decreased.

In the present embodiment, when the engine is started with the water temperature THW that is low to a certain extent, the catalyst 34 hypothetically becomes activated before the water temperature THW reaches the predetermined temperature Tth1. That is, even after the process for warming up the catalyst 34 ends, the multiple injection process is executed. To quickly warm up the catalyst 34, known techniques such as the retardation control of an ignition timing and a dither control for arranging a cylinder with a richer air-fuel ratio than the stoichiometric air-fuel ratio and a cylinder with a leaner air-fuel ratio than the stoichiometric air-fuel ratio can be employed.

The present embodiment described above further has the following advantages.

(1) When the water temperature THW exceeds the predetermined temperature Tth1, the multiple injection process is not executed. Thus, for example, the multiple injection process is executed when the water temperature THW is 40° C., and the multiple injection process is not executed when the water temperature THW is 80° C. Accordingly, as compared to when the multiple injection process is continued, the frequency of driving the port injection valve 16 is reduced. This delays the progress of deterioration of the port injection valve 16. Further, in the case of the single injection process, as compared to the employment of the intake synchronous injection, the employment of the intake asynchronous injection reduces the generation of HC and improves the uniformity of fuel and air.

(2) When the requested injection amount Qd is less than the predetermined value Qdth, only the intake asynchronous injection is executed without executing the multiple injection. This prevents a single injection amount by the port injection valve 16 from becoming less than the minimum injection amount.

(3) The above-described difference Δns between the injection start timings Ins of the intake asynchronous injection is larger than the above-described difference Δs between the injection start timings Is of the intake synchronous injection. Thus, the interval between the injection end timing of the intake asynchronous injection and the injection start timing Is of the intake synchronous injection is ensured, and the injection start timing Is of the intake synchronous injection can be set to a suitable value for reducing PN.

Correspondence

The correspondence between the items in the above embodiments and the items described in the above-described SUMMARY is as follows. In the following description, the correspondence is shown for each of the numbers in the examples described in the SUMMARY.

[1] The requested injection amount calculation process corresponds to the base injection amount calculation process M30, the target value setting process M118, the feedback process M32, and the correction process M122.

The operation process corresponds to the process of S66.

The multiple injection process corresponds to the process of S66 performed when an affirmative determination is made in the process of S50. The control device corresponds to the control device 50.

[2] Example 2 corresponds to the process for the case in which an affirmative determination is made in the process of S46 and the case in which a negative determination is made in the process of S46.

[3] Example 3 corresponds to the process for the case in which an affirmative determination is made in the process of S48 and the case in which a negative determination is made in the process of S48.

[4] The variably setting process corresponds to the process of S62. FIG. 3 shows the magnitude relationship between the difference Δns between the injection start timings Ins of the intake asynchronous injection and the difference Δs between the injection start timings Is of the intake synchronous injection.

[5] The operation process corresponds to the process of S30, and the variably setting process corresponds to the process of S26.

Modifications

At least one of the features of the above-described embodiment may be modified as follows. The above-described embodiments and the following modifications can be combined as long as the combined modifications remain technically consistent with each other.

Requested Injection Amount Qd

The base injection amount Qb does not have to be corrected by the feedback operation amount KAF1. Further, for example, when a purge control is executed, the requested injection amount Qd may be a value obtained by subtracting the amount of fuel to be purged for each cylinder. Alternatively, the requested injection amount Qd may be a value obtained by correcting the base injection amount Qb with the feedback operation amount KAF1 and a learning value LAF. The process for calculating the learning value LAF is a process for updating the learning value LAF so as to reduce the correction ratio of the base injection amount Qb using the feedback operation amount KAF1 with the feedback operation amount KAF1 used as an input. It is desired that the learning value LAF be stored in an electrically rewritable non-volatile memory.

As another option, the requested injection amount Qd may be a value obtained by correcting the base injection amount Qb with the increase coefficient Kw1. In this case, the process for multiplying the increase coefficient is deleted from the processes of S54, S56, and S60 in FIG. 6.

Intake Synchronous Injection

In the above-described embodiment, the setting of the injection start timing Is immediately before the intake valve 18 opens is exemplified as the intake synchronous injection. Instead, the intake synchronous injection is to set the injection start timing Is when the intake valve 18 opens after a timing at which the intake valve 18 starts opening.

The intake synchronous injection does not have to be achieved by a process for determining the injection end timing with the injection start timing Is. For example, the injection start timing Is may be calculated based on the reach end timing, the synchronous injection amount Qs, and the rotation speed NE by calculating the reach end timing, which is a target value of the ending point of a period during which the fuel injected from the port injection valve 16 reaches the position in the closed period of the intake valve 18 (the downstream end of the intake port, that is, the inlet of the combustion chamber 24). The "ending point of a period" refers to a timing at which fuel injected at the latest timing in the fuel injected from the port injection valve 16 reaches the position in the closed period of the intake valve 18. Even in this case, it is desired that the intake synchronous injection be to inject fuel in synchronization with the open period of the intake valve 18. More specifically, the intake synchronous injection is to inject fuel such that the period in which the fuel injected from the port injection valve 16 reaches the position of the intake valve 18 prior to opening is the open period of the intake valve 18. By contrast, the intake asynchronous injection is to inject fuel such that the period in which the fuel injected from the port injection valve 16 reaches the position of the intake valve 18 prior to opening is the closed period of the intake valve 18.

Figure 9A:
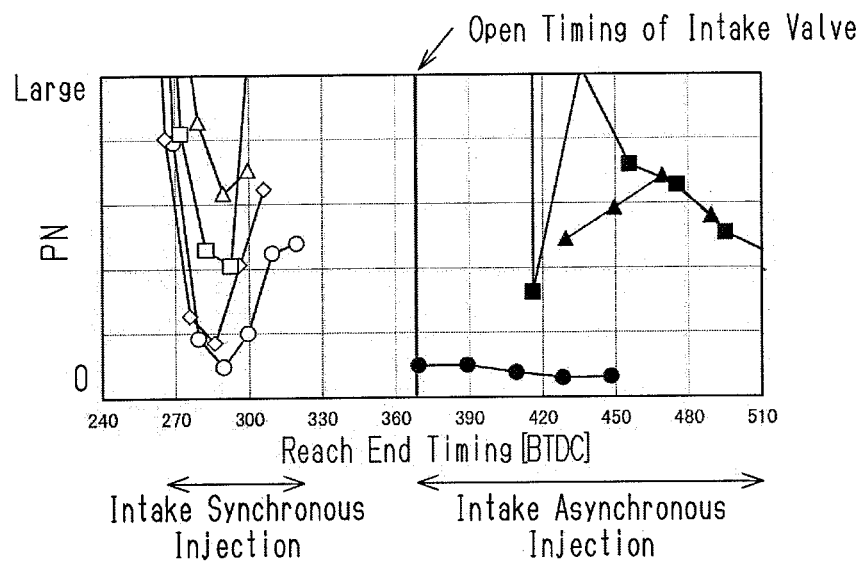
FIG. 9A is a graph showing the relationship between a reach end timing of the multiple injection process and the generation amount of PN in the internal combustion engine of FIG. 1.
Figure 9B:
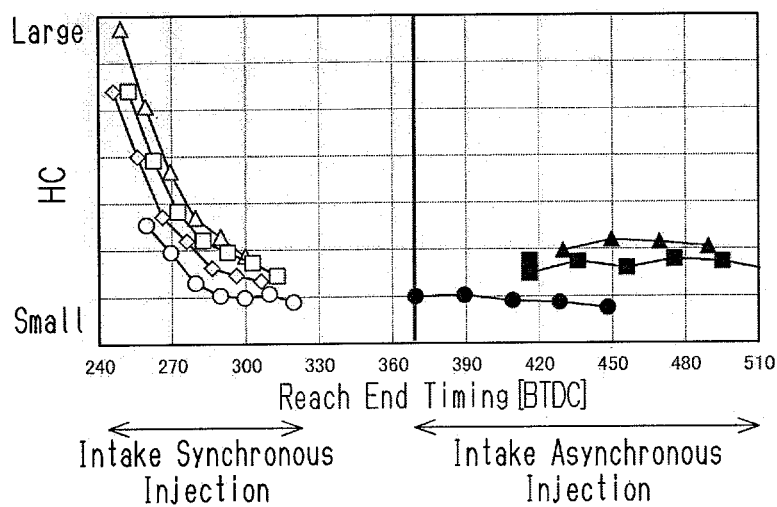
FIG. 9B is a graph showing the relationship between the reach end timing of the multiple injection process and the generation amount of HC in the internal combustion engine of FIG. 1.

FIG. 9A shows PN generated when the reach end timings of the intake asynchronous injection and the intake synchronous injection are changed, and FIG. 9B shows the amount of HC generated when the reach end timings of the intake asynchronous injection and the intake synchronous injection are changed. The white plots indicate the generation amounts in which the reach end timing of the intake asynchronous injection is fixed and the reach end timing of the intake synchronous injection is changed, and the black plots indicate generation amounts in which the reach end timing of the intake synchronous injection fixed and the reach end timing of the intake asynchronous injection is changed. The circle plots, the rhombus plots, the square plots, and the triangular plots respectively correspond to 8:2, 7:3, 6:4, and 5:5 in the ratio of the asynchronous injection amount Qns to the synchronous injection amount Qs.

As shown in FIGS. 9A and 9B, the generation amount of PN and HC greatly changes depending on the changes in the reach end timing of the intake synchronous injection.

Condition for Executing Multiple Injection Process

In the above-described embodiment, the temperature at which the increase coefficient (Kw1, Kwns, and Kws) is greater than 1 is equal to the predetermined temperature Tth1, which is the condition for executing the multiple injection process. However, the temperature does not have to be equal to the predetermined temperature Tth1. Further, the predetermined temperature Tth1, which is the condition for executing the multiple injection process, is not limited to 60° C.

The condition for executing the multiple injection process does not have to include a condition in which the temperature of the internal combustion engine 10 is low.

In the above-described embodiment, the requested injection amount Qd is used as a load parameter for determining the condition for executing the multiple injection process. However, the requested injection amount Qd does not have to be used as the load parameter. For example, the load factor KL may be used. Even in this case, it can be determined whether the injection amount of the port injection valve 16 may fall below the minimum injection amount.

In the above-described embodiment, the condition for executing the multiple injection is that the requested injection amount Qd is greater than or equal to the predetermined value Qdth, and the predetermined value Qdth is a fixed value. Instead, the predetermined value Qdth may be larger when the pressure of fuel injected from the port injection valve 16 is high than when the pressure is low.

The process having a condition in which the amount of fuel injected from the port injection valve 16 does not become less than the minimum injection amount is not limited to the process performed prior to the calculation of the asynchronous injection amount Qns and the synchronous injection amount Qs. For example, when the asynchronous injection amount Qns and the synchronous injection amount Qs subsequent to being calculated are less than the minimum injection amount, a process for prohibiting the multiple injection process may be employed.

Determining the condition for executing the multiple injection process in accordance with the load does not have to be intended to prevent the injection amount of the port injection valve 16 from falling below the minimum injection amount. For example, when the load is small after the predetermined period has elapsed since the starter motor 36 was activated, PN is reduced as shown in FIG. 7A. Thus, when the load is small after the predetermined period has elapsed, the multiple injection may be intended not to be executed.

The condition for executing the multiple injection process does not have to include a condition in which the load is greater than or equal to a predetermined value.

Asynchronous Injection Amount Qns and Synchronous Injection Amount Qs

In the process of S56, the synchronous injection amount Qs may be a value obtained by subtracting Km·Qd from the requested injection amount Qd and then multiplying that value by the synchronous increase coefficient Kws.

In the above-described embodiment, no particular description is made on an injection amount correction amount (wet correction amount) of a feedforward control that compensates for a change in the amount of fuel collecting on the intake passage 12 that occurs when the load factor KL or the rotation speed NE changes. However, the injection amount correction amount may be used. That is, for example, the process of S54 may be replaced with a process for substituting, into the asynchronous injection amount Qns, a value obtained by adding the wet correction amount to the value obtained by multiplying the requested injection amount Qd by the injection ratio Km and the asynchronous increase coefficient Kwns, which is output by the increase coefficient calculation process M36. In this case, it is desired that the process of S56 be to set the synchronous injection amount Qs to a value obtained by multiplying the synchronous increase coefficient Kws by the value obtained by subtracting Km·Qd from the requested injection amount Qd. Further, a value obtained by subtracting the synchronous injection amount Qs from the requested injection amount Qd, multiplying that value by the asynchronous increase coefficient Kwns, and then adding the wet correction amount to that value may be substituted into the asynchronous injection amount Qns in the process of S60.

Splitting of Requested Injection Amount Qd

In the above-described embodiment, the injection ratio Km is variably set based on the rotation speed NE, the load factor KL, the water temperature THW, and the intake phase difference DIN. However, the injection ratio Km does not have to be variably set based on these parameters. For example, the requested injection amount Qd may be used instead of the load factor KL as the load parameter indicating load. Alternatively, the injection ratio Km may be variably set based on two parameters: load parameter and rotation speed NE; load parameter and water temperature THW; or load parameter and intake phase difference DIN). As another option, the injection ratio Km may be variably set based on three parameters: load parameter, rotation speed NE, and water temperature THW; load parameter, rotation speed NE, and intake phase difference DIN; or load parameter, water temperature THW, intake phase difference DIN. As an alternative, the injection ratio Km may be variably set using only the load parameter or only the water temperature THW or of at least four parameters (load parameter, rotation speed NE, water temperature THW, and intake phase difference DIN). Instead of the four parameters, the intake pressure and the flow speed of intake air may be used. The four parameters allow the intake pressure and the flow speed of intake air to be obtained.

The injection ratio Km does not have to be used. For example, the synchronous injection amount Qs may be calculated using the above-described parameters exemplified for setting the injection ratio Kin, and the value obtained by subtracting the synchronous injection amount Qs from the requested injection amount Qd may be set as the asynchronous injection amount Qns.

Temperature of Internal Combustion Engine

In the above-described embodiment, the water temperature THW is employed as the temperature of the internal combustion engine 10 serving as the parameter that determines the injection ratio Km, the injection start timings Is and Ins, and the increase coefficient (Kw1, Kwns, and Kws). Instead, for example, when the information of a wall surface temperature of the intake passage 12 can be obtained, the wall surface temperature may be employed.

Variably Setting Process of Injection Start Timing

In the processes of FIGS. 5 and 6, the injection start timing Ins of the intake asynchronous injection and the injection start timing Is of the intake synchronous injection are both variably set in accordance with the water temperature THW. Instead, for example, the injection start timing Is of the intake synchronous injection may be a fixed value.

When the requested injection amount Qd is split, instead of variably setting in accordance with only the water temperature THW, the injection start timing Ins of the intake asynchronous injection may be variably set in accordance with the water temperature THW and other parameters such as the rotation speed NE, the asynchronous injection amount Qns, and the intake phase difference DIN. Alternatively, the injection start timing Ins of the intake asynchronous injection may be variably set without using the water temperature THW, for example, in accordance with the asynchronous injection amount Qns.

When the requested injection amount Qd is split, instead of variably setting in accordance with only the water temperature THW, the injection start timing Is of the intake synchronous injection may be variably set in accordance with the water temperature THW and other parameters such as the rotation speed NE, the synchronous injection amount Qs, and the intake phase difference DIN.

When the requested injection amount Qd is split, the difference Ons between the injection start timings Ins of the intake asynchronous injection does not have to be greater than the difference Δs between the injection start timings Is of the intake synchronous injection.

Actuation Varying Device for Intake Valve

The actuation varying device that changes the actuation of the intake valve 18 is not limited to the intake valve timing adjustment device 44. For example, the actuation varying device may be a device that changes a lift amount. In this case, the parameter indicating the valve actuation of the intake valve 18 is the lift amount or the like instead of the intake phase difference DIN.

Fuel Injection Control Device

The fuel injection control device is not limited to a device that includes the CPU 52 and the ROM 54 and executes software processing. For example, at least part of the processes executed by the software in the above-illustrated embodiment may be executed by hardware circuits dedicated to executing these processes (such as ASIC). That is, the fuel injection control device may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Others

The internal combustion engine 10 does not need to include the intake valve timing adjustment device 44. The internal combustion engine 10 does not need to include the throttle valve 14. The definition of the load factor KL in the case of the throttle valve 14 can be made by defining the above-described air amount serving as a reference regardless of the open degree of the throttle valve 14.

A control device for an internal combustion engine according to a second embodiment of the present disclosure will now be described with reference to FIGS. 10 to 15B.

Figure 10:
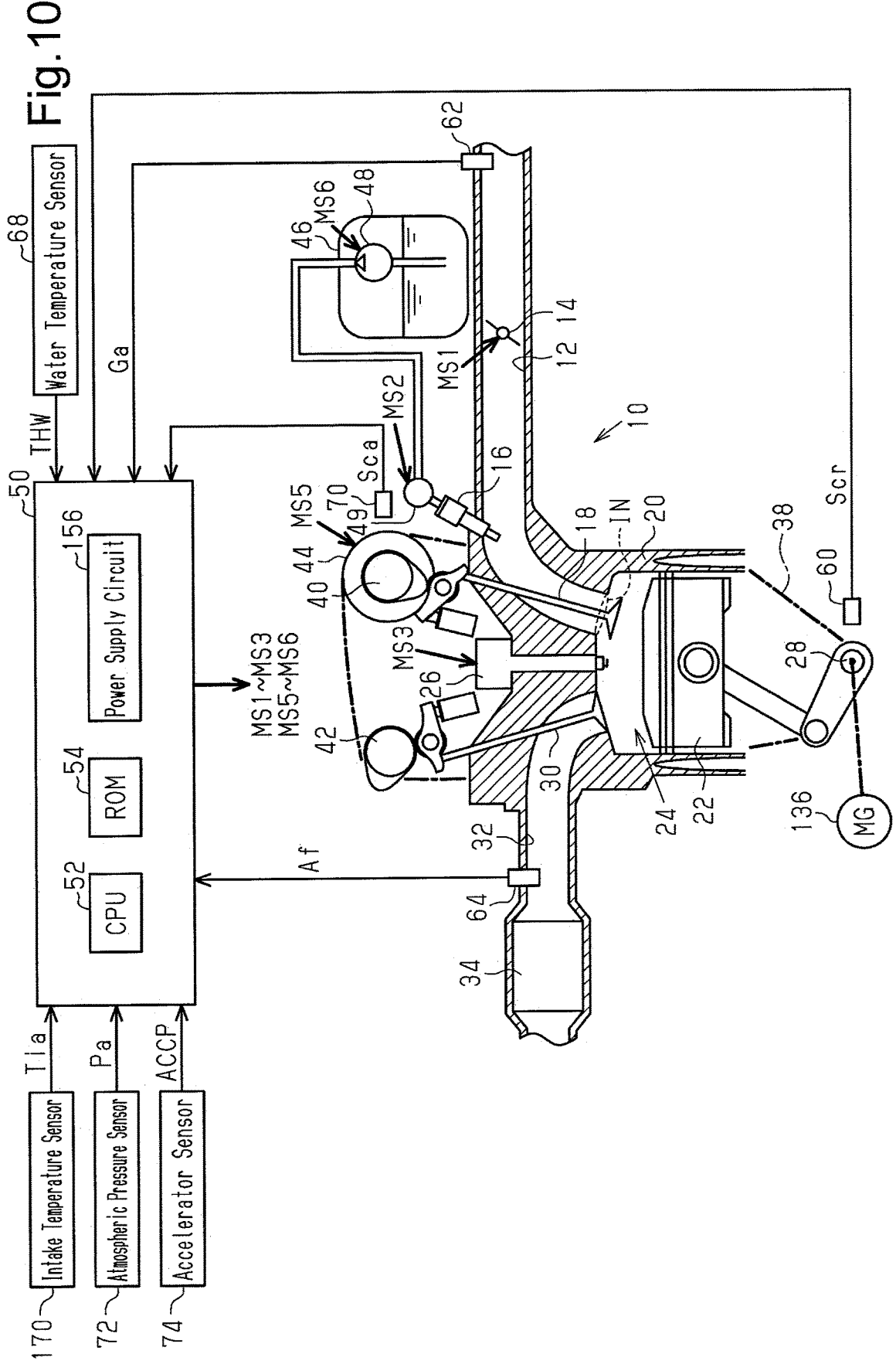
FIG. 10 is a diagram showing a control device and an internal combustion engine according to a second embodiment of the present disclosure.

The internal combustion engine 10 shown in FIG. 10 is mounted on a vehicle. The internal combustion engine 10 includes the intake passage 12. The intake passage 12 includes, sequentially from the upstream side, the throttle valve 14 and the port injection valve 16. The air drawn into the intake passage 12 and the fuel injected from the port injection valve 16 flow into the combustion chamber 24, which is defined by the cylinder 20 and the piston 22, as the intake valve 18 opens. The air-fuel mixture of fuel and air drawn into the combustion chamber 24 is burned by the spark discharge of the ignition device 26. The energy generated through the combustion is converted into rotation energy of the crankshaft 28 by the piston 22. The burned air-fuel mixture is discharged to the exhaust passage 32 as exhaust gas when the exhaust valve 30 opens. The exhaust passage 32 includes the catalyst 34.

A motor generator 136, which generates the thrust of the vehicle together with the internal combustion engine 10, is mechanically coupled to the crankshaft 28. That is, the vehicle according to the present embodiment is a hybrid vehicle that includes the internal combustion engine 10 and the motor generator 136 as thrust generators of the vehicle.

The rotation power of the crankshaft 28 is transmitted through the timing chain 38 to the intake camshaft 40 and the exhaust camshaft 42. In the present embodiment, the power of the timing chain 38 is transmitted to the intake camshaft 40 through the intake valve timing adjustment device 44. The intake valve timing adjustment device 44 is an actuator that adjusts the timing at which the intake valve 18 starts opening by adjusting the rotation phase difference between the crankshaft 28 and the intake camshaft 40.

A fuel tank 46 stores fuel supplied to the port injection valve 16. The fuel in the fuel tank 46 is drawn in by a feed pump 48 and supplied to a delivery pipe 49. The port injection valve 16 injects the fuel in the delivery pipe 49.

The control device 50 controls the internal combustion engine 10. In order to control the control amount (for example, torque or exhaust component ratio) of the internal combustion engine 10, the control device 50 operates operation units of the internal combustion engine 10 such as the throttle valve 14, the port injection valve 16, the ignition device 26, the intake valve timing adjustment device 44, and the feed pump 48. The control device 50 refers to the output signal Scr of the crank angle sensor 60, the intake air amount Ga, which is detected by the airflow meter 62, the air-fuel ratio Af, which is detected by the air-fuel ratio sensor 64 serving as the air-fuel ratio sensor, the output signal Sca of the intake cam angle sensor 70, the temperature of coolant (water temperature THW) of the internal combustion engine 10, which is detected by the water temperature sensor 68. Further, the control device 50 refers to the temperature (intake temperature Tia) of gas in the intake passage 12 detected by an intake temperature sensor 170, an atmospheric pressure Pa detected by the atmospheric pressure sensor 72, and a depression amount (accelerator operation amount ACCP) of an accelerator pedal detected by an accelerator sensor 74. FIG. 10 shows operation signals MS1 to MS3 and MS5 to MS6 for operating the throttle valve 14, the port injection valve 16, the ignition device 26, the intake valve timing adjustment device 44, and the feed pump 48, respectively.

The control device 50 includes the CPU 52, the ROM 54, and a power supply circuit 156 and controls the above-described control amount by the CPU 52 executing programs stored in the ROM 54. The power supply circuit 156 supplies power to each part in the control device 50.

Figure 11:
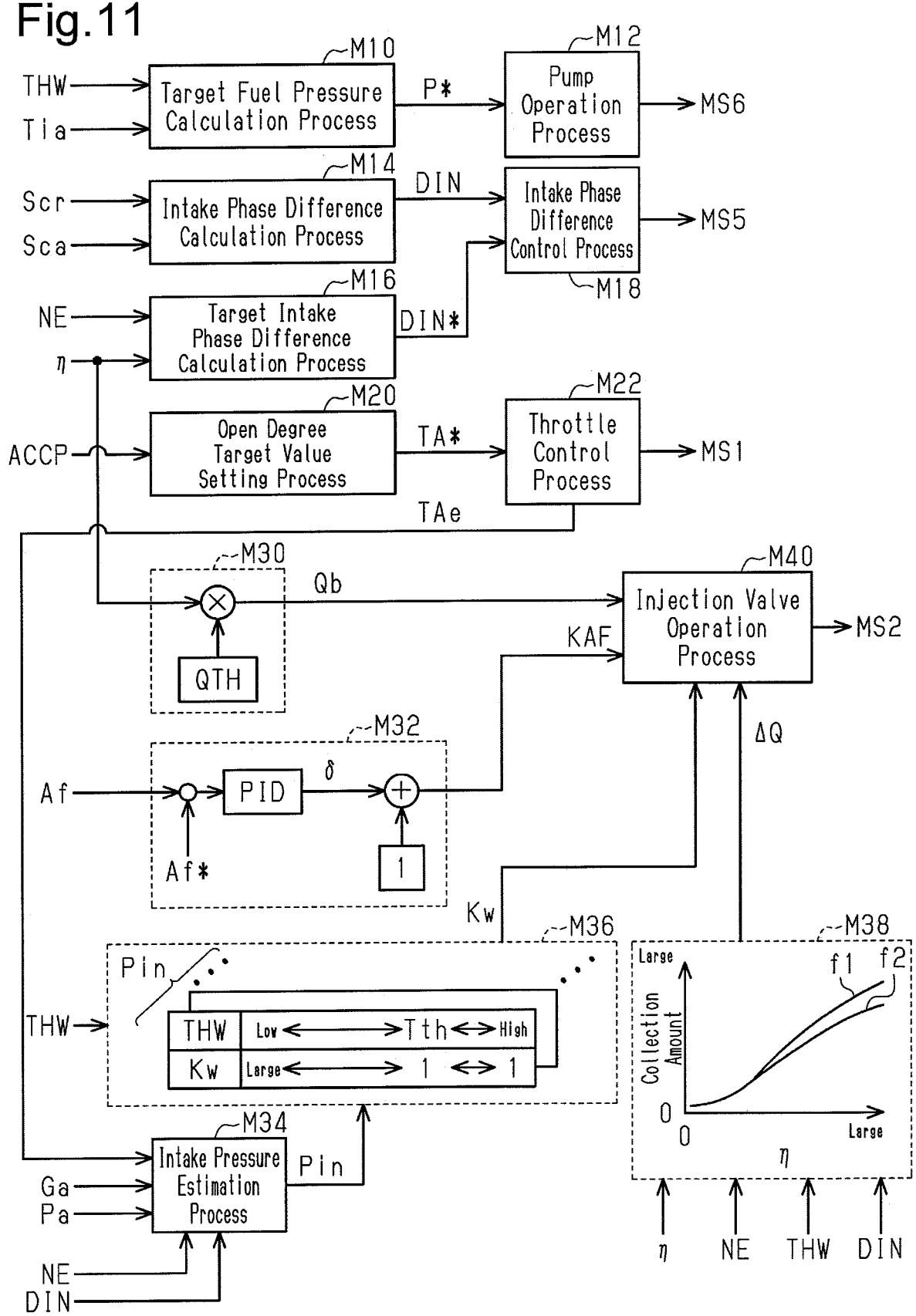
FIG. 11 is a block diagram showing part of processes executed by the control device in the internal combustion engine of FIG. 10.

FIG. 11 shows part of processes executed by control device 50. The processes shown in FIG. 11 are implemented by the CPU 52 executing the programs stored in the ROM 54.

A target fuel pressure calculation process M10 is a process for calculating a target fuel pressure P*, which is a target value of the pressure of fuel in the delivery pipe 49, based on the water temperature THW and the intake temperature Tia.

A pump operation process M12 is a process for operating the feed pump 48 by outputting the operation signal MS6 to the feed pump 48 in order to control the fuel pressure in the delivery pipe 49 to the target fuel pressure P*.

The intake phase difference calculation process M14 is a process for calculating an intake phase difference DIN, which is a phase difference of the rotation angle of the intake camshaft 40 relative to the rotation angle of the crankshaft 28, based on the output signal Scr of the crank angle sensor 60 and the output signal Sca of the intake cam angle sensor 70. The target intake phase difference calculation process M16 is a process for variably setting the target intake phase difference DIN* based on the operating point of the internal combustion engine 10. In the present embodiment, the operation point is defined by the rotation speed NE and the charging efficiency $\eta$. The CPU 52 calculates the rotation speed NE based on the output signal Scr of the crank angle sensor 60 and calculates the charging efficiency $\eta$ based on the rotation speed NE and the intake air amount Ga. The charging efficiency $\eta$ is a parameter that determines the amount of air filling the combustion chamber 24.

The intake phase difference control process M18 is a process for outputting the operation signal MS5 in order to operate the intake valve timing adjustment device 44 so that the intake phase difference DIN is controlled to the target intake phase difference DIN*.

An open degree target value setting process M20 is a process for setting a target value (target open degree TA*) of the open degree of the throttle valve 14 based on the accelerator operation amount ACCP. More specifically, for example, the open degree target value setting process M20 is a process for setting the target open degree TA* to be larger when the accelerator operation amount ACCP is large than when the accelerator operation amount ACCP is small.

A throttle control process M22 is a process for outputting the operation signal MS1 in order to operate the throttle valve 14 so that the open degree of the throttle valve 14 is controlled in accordance with the target open degree TA*.

The base injection amount calculation process M30 is a process for calculating the base injection amount Qb, which is the base value of a fuel amount for setting the air-fuel ratio of the air-fuel mixture in the combustion chamber 24 to the target air-fuel ratio based on the charging efficiency $\eta$. More specifically, when, for example, the charging efficiency $\eta$ is expressed in percentage, the base injection amount calculation process M30 simply needs to be a process for calculating the base injection amount Qb by multiplying the charging efficiency $\eta$ by a fuel amount QTH per one percent of the charging efficiency $\eta$ for setting the air-fuel ratio to the target air-fuel ratio. The base injection amount Qb is a fuel amount calculated to control the air-fuel ratio to the target air-fuel ratio based on the amount of air filling the combustion chamber 24. The target air-fuel ratio simply needs to be set to, for example, the stoichiometric air-fuel ratio.

The feedback process M32 is a process for calculating and outputting a feedback correction coefficient KAF, which is obtained by adding 1 to a correction ratio $\delta$ of the base injection amount Qb. The correction ratio 6 of the base injection amount Qb is a feedback operation amount for performing feedback control on the air-fuel ratio Af to the target value Af*. More specifically, the feedback process M32 sets, to the correction ratio $\delta$, the sum of the output values of a proportional element and a differential element in which the difference between the air-fuel ratio Af and the target value Af* is an input and the output value of an integral element that maintains and outputs the integration value of a value corresponding to the difference between the air-fuel ratio Af and the target value Af*.

An intake pressure estimation process M34 is a process for estimating the pressure (intake pressure Pin) at the downstream section of the throttle valve 14 in the intake passage 12 based on the intake air amount Ga, the atmospheric pressure Pa, the rotation speed NE, the intake phase difference DIN, and a prediction open degree TAe. The prediction open degree TAe is output from the throttle control process M22. The prediction open degree TAe is an open degree of the throttle valve 14 predicted ahead by a given time through the control by the throttle control process M22. Such a process can be achieved by, for example, controlling an actual open degree to a delay open degree, in which a change in the target open degree TA* is delayed by the given time, and then setting the prediction open degree TAe to a value corresponding to the target open degree TA* in the throttle control process M22. More specifically, the intake pressure estimation process M34 is a process for estimating the intake pressure Pin to be a larger value when the prediction open degree TAe is large than when the prediction open degree TAe is small. Further, the intake pressure estimation process M34 is a process for estimating the intake pressure Pin to be a larger value when the atmospheric pressure Pa is high than when the atmospheric pressure Pa is low. Furthermore, the intake pressure estimation process M34 is a process for estimating the intake pressure Pin to be a larger value when the intake air amount Ga is large than when the intake air amount Ga is small. The intake pressure Pin is a predication value of the intake pressure Pin that is obtained ahead by the given time.

The increase coefficient calculation process M36 is a process for calculating the low-temperature increase coefficient Kw to be larger than 1 in order to increase the base injection amount Qb when the water temperature THW is less than a given temperature Tth (for example, 70° C.). More specifically, the low-temperature increase coefficient Kw is calculated to be a larger value when the water temperature THW is low than when the water temperature THW is high. When the water temperature THW is greater than or equal to the given temperature Tth, the low-temperature increase coefficient Kw is set to 1 and thus the correction amount of the base injection amount Qb with the low-temperature increase coefficient Kw becomes 0. Such a process is performed in view of the fact that the amount of fuel that does not contribute to combustion in the combustion chamber 24 in the fuel injected from the port injection valve 16 becomes larger when the water temperature THW is low than when the water temperature THW is high.

In addition, the increase coefficient calculation process M36 includes a process for calculating the low-temperature increase coefficient Kw to be larger when the intake pressure Pin is high than when the intake pressure Pin is low in a case in which the water temperature THW is less than the given temperature Tth. Such a process is performed in view of the fact that since the vapor pressure of fuel in the intake passage 12 is higher when the intake pressure Pin is high than when the intake pressure Pin is low, the atomization of fuel is limited and thus an increase occurs in the amount of fuel that does not contribute to combustion in the combustion chamber 24 in the fuel injected from the port injection valve 16.

The increase coefficient calculation process M36 is achieved by the CPU 52 performing map calculation for the low-temperature increase coefficient Kw in a state in which the ROM 54 stores in advance map data including the water temperature THW and the intake pressure Pin as input variables and the low-temperature increase coefficient Kw as an output variable. The map data refers to a data set of discrete values of input variables and values of output variables each corresponding to a value of the input variables. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

A transient correction amount calculation process M38 is a process for calculating a transient correction amount ΔQ. The transient correction amount ΔQ is an operation amount of the feedforward control that prevents the amount of fuel flowing into the combustion chamber 24 from becoming excessive or insufficient during a transient time in which the amount of fuel collecting on the intake passage 12 changes. The transient correction amount calculation process M38 includes, for example, a process for calculating the transient correction amount ΔQ to a negative value when the charging efficiency η decreases in order to prevent situations in which the amount of fuel collecting on the intake passage 12 transiently decreases and the decreased amount is reflected on the amount of fuel flowing into the combustion chamber 24 so that the amount of the fuel becomes excessive relative to the base injection amount Qb. Further, the transient correction amount calculation process M38 includes, for example, a process for calculating the transient correction amount ΔQ to a positive value when the charging efficiency η increases because a transient increase in the amount of fuel collecting on the intake passage 12 causes the amount of fuel flowing into the combustion chamber 24 to become insufficient relative to the base injection amount Qb by the increased amount. More specifically, the transient correction amount calculation process M38 is a process for calculating the transient correction amount ΔQ based on the charging efficiency η, the water temperature THW, the rotation speed NE, and the intake phase difference DIN and based on whether the multiple injection process or the single injection process (described later) is executed. The transient correction amount ΔQ is zero during a steady-state time.

FIG. 11 schematically shows a curve f2 and a curve f1. The curve f2 indicates the relationship between the charging efficiency η and the amount of fuel collecting on the intake passage 12 in the case of the multiple injection process. The curve f1 indicates the relationship between the charging efficiency η and the collection amount in the case of the single injection process.

The injection valve operation process M40 is a process for outputting the operation signal MS2 to the port injection valve 16 in order to operate the port injection valve 16 based on the base injection amount Qb, the feedback correction coefficient KAF, the low-temperature increase coefficient Kw, and the transient correction amount ΔQ. More specifically, the injection valve operation process M40 is a process for causing the port injection valve 16 to inject the requested injection amount Qd, which is the amount of fuel requested to be supplied to a single cylinder in a single combustion cycle from the port injection valve 16.

Figure 12:
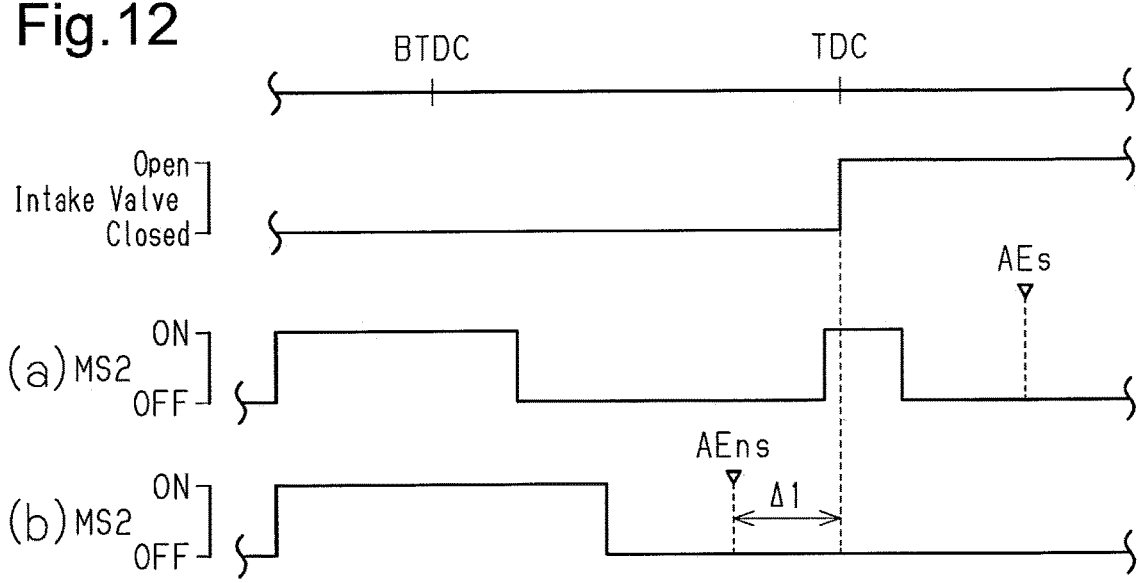
FIG. 12 is a timing diagram showing injection patterns in the internal combustion engine of FIG. 10, including section (a) and section (b).

The fuel injection processes of the present embodiment include two types of processes, namely, a process illustrated in section (a) of FIG. 12 and a process illustrated in section (b) of FIG. 12.

Section (a) of FIG. 12 illustrates the intake synchronous injection, which injects fuel in synchronization with the open period of the intake valve 18, and the intake asynchronous injection, which injects fuel at a timing advanced with respect to the timing of the intake synchronous injection.

More specifically, the intake synchronous injection is to inject fuel such that the period in which the fuel injected from the port injection valve 16 reaches the position of the intake valve 18 prior to opening is within the open period of the intake valve 18. The position of the intake valve 18 prior to opening is the downstream end of the intake port, that is, an inlet IN of the combustion chamber 24 shown in FIG. 10. FIG. 10 shows a state in which the intake valve 18 is open. The starting point of the fuel-reaching period is the timing at which the fuel injected at the earliest timing in the fuel injected from the port injection valve 16 reaches the position of the intake valve 18 prior to opening. The end point of the fuel-reaching period is the timing at which the fuel injected at the latest timing in the fuel injected from the port injection valve 16 reaches the position of the intake valve 18 prior to opening. The intake asynchronous injection is to inject fuel such that the fuel injected from the port injection valve 16 reaches the intake valve 18 before the intake valve 18 opens. In other words, in the intake asynchronous injection, the fuel injected from the port injection valve 16 remains in the intake passage 12 until the intake valve 18 opens and flows into the combustion chamber 24 after the intake valve 18 opens. In the present embodiment, in the intake asynchronous injection, fuel is injected such that the period in which the fuel injected from the port injection valve 16 reaches the position of the intake valve 18 prior to opening is within the closed period of the intake valve 18.

Section (b) of FIG. 12 illustrates the single injection process for executing only the intake asynchronous injection.

In the present embodiment, the multiple injection process is executed with the intention of reducing the number (PN) of particulate matter (PM) in exhaust gas. That is, in a case in which the temperature of the intake system of the internal combustion engine 10 such as the intake passage 12 and the intake valve 18 is low to a certain extent, PN tends to increase when the single injection process is executed in a region where the charging efficiency $\eta$ is high to a certain extent. This may be because the requested injection amount Qd is larger when the charging efficiency $\eta$ is high than when the charging efficiency $\eta$ is low and thus the amount of fuel collecting on the intake system increases. More specifically, when the amount of fuel collecting on the intake system increases to a certain extent, shearing the collected fuel presumably causes some of the collected fuel to flow into the combustion chamber 24 in a state in which they remain droplets. In the present embodiment, even when the requested injection amount Qd is large, injecting some of the requested injection amount Qd with the intake synchronous injection reduces the amount of fuel collecting on the intake system considering a large amount of the requested injection amount Qd and consequently reduces PN.

The transient correction amount calculation process M38 in FIG. 11 sets the transient correction amount $\Delta Q$ to a value other than zero even when the injection process is switched between the multiple injection process and the single injection process. That is, the amount of fuel collecting on the intake passage 12 is larger when the multiple injection process is implemented than when the single injection process is implemented. Thus, for example, when the injection process is switched from the single injection process to the multiple injection process, the amount of fuel collecting on the intake passage 12 transiently decreases so that the fuel flows into the combustion chamber 24 with the decreased amount reflected on the fuel amount. Thus, the amount of fuel flowing into the combustion chamber 24 is prevented from becoming excessive by setting the transient correction amount $\Delta Q$ to be a value smaller than zero.

Figure 13:
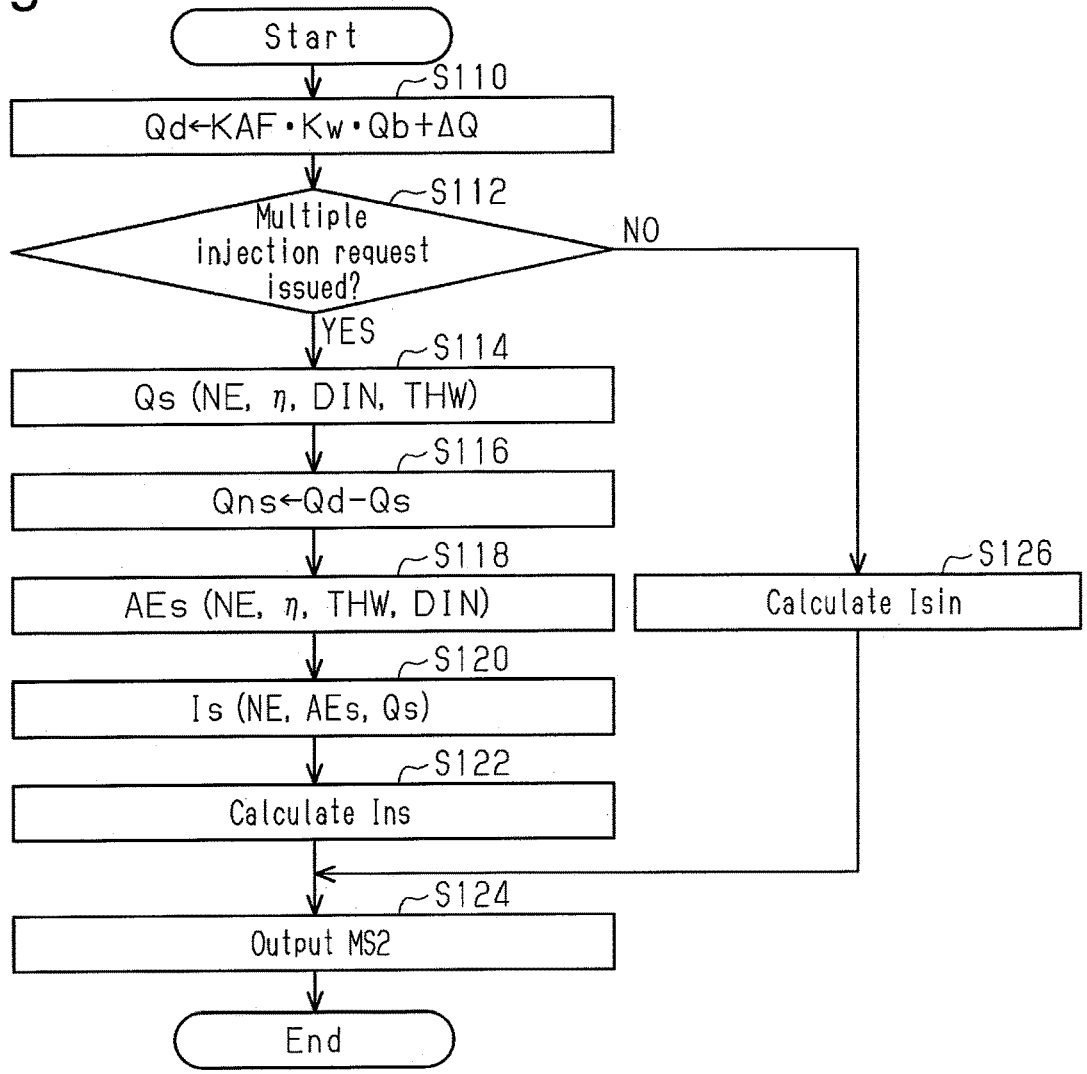
FIG. 13 is a flowchart illustrating the procedure for an injection valve operation process in the internal combustion engine of FIG. 10.

FIG. 13 illustrates a procedure for the injection valve operation process M40. The processes shown in FIG. 13 are executed by the CPU 52 repeatedly executing programs stored in the ROM 54 at a predetermined interval. In the following description, the number of each step is represented by the letter S followed by a numeral.

In a series of processes shown in FIG. 13, the CPU 52 first multiplies the base injection amount Qb by the low-temperature increase coefficient Kw and the feedback correction coefficient KAF and then adds the transient correction amount $\Delta Q$ to the multiplied value to calculate the requested injection amount Qd (S110). Next, the CPU 52 determines whether a multiple injection request has been issued (S112). The CPU 52 determines that the request for executing the multiple injection process has been issued when the logical conjunction of a condition (i), a condition (ii), and a condition (iii) is true. Condition (i) is that the water temperature THW is less than or equal to the given temperature Tth. Condition (ii) is that the charging efficiency $\eta$ is greater than or equal to a given value. Condition (iii) is that the rotation speed NE is less than or equal to the predetermined speed NEth. Condition (iii) is used to set the time interval between the end timing of the intake asynchronous injection and the start timing of the intake synchronous injection to be greater than or equal to the predetermined time. Further, this condition is that since the multiple injection process produces a larger load than the single injection process, an increase in the calculation load of the control device 50 prevents the heat-generation amount from becoming excessively large. The above-described predetermined time is determined in accordance with the structure of the port injection valve 16 and is a value that prevents the intake synchronous injection from starting before the intake asynchronous injection ends.

When determining that the multiple injection request has been issued (S112: YES), the CPU 52 calculates the synchronous injection amount Qs, which is an injection amount of the intake synchronous injection (S114). The CPU 52 calculates the synchronous injection amount Qs in accordance with the rotation speed NE, the charging efficiency $\eta$, the water temperature THW, and the intake phase difference DIN. The synchronous injection amount Qs is adapted to an appropriate value for reducing PN.

Here, PN is affected by the charging efficiency $\eta$ presumably because the base injection amount Qb is determined in accordance with the charging efficiency $\eta$ and the pressure in the intake passage 12 is determined in accordance with the charging efficiency $\eta$. Further, PN is affected by the water temperature THW presumably because the water temperature THW correlates with the temperature of the intake system and the temperature of the intake system varies how easily fuel can be atomized. Furthermore, PN is affected by the intake phase difference DIN presumably because the length of an overlap period in which the intake valve 18 and the exhaust valve 30 are both open changes in accordance with the intake phase difference DIN and thus a change occurs in the amount in which air-fuel mixture burned in the combustion chamber 24 is blown back into the intake passage 12. That is, since the temperature of the intake system increases in accordance with the amount in which air-fuel mixture burned in the combustion chamber 24 is blown back into the intake passage 12, the intake phase difference DIN varies how easily fuel can be atomized. Additionally, PN is affected by the rotation speed NE. This is presumably because the amount in which the crankshaft 28 rotates until fuel injected from the port injection valve 16 is atomized increases as the rotation speed NE increases so that atomization cannot be tolerantly performed.

The requested injection amount Qd is larger when the water temperature THW is low than when the water temperature THW is high. Thus, it is desired that the synchronous injection amount Qs be a large value. Further, the requested injection amount Qd is larger when the charging efficiency η is high than when the charging efficiency η is low. Thus, it is desired that the synchronous injection amount Qs be a large value. Furthermore, it is desired that the ratio of the synchronous injection amount Qs occupying the base injection amount Qb be smaller when the overlap amount is large than when the overlap amount is small.

More specifically, the CPU 52 performs map calculation for the synchronous injection amount Qs in a state in which the ROM 54 stores in advance map data including the rotation speed NE, the charging efficiency η, the water temperature THW, and the intake phase difference DIN as input variables and including the synchronous injection amount Qs as an output variable.

Subsequently, the CPU 52 subtracts the synchronous injection amount Qs from the requested injection amount Qd to calculate the asynchronous injection amount Qns, which is an injection amount of the intake asynchronous injection (S116).

Thus, the sum of the asynchronous injection amount Qns and the synchronous injection amount Qs is equal to the requested injection amount Qd. That is, the processes of S114 and S116 are performed to split the fuel of the requested injection amount Qd into the asynchronous injection amount Qns and the synchronous injection amount Qs. The synchronous injection amount Qs is unaffected by the values of the feedback correction coefficient KAF, the low-temperature increase coefficient Kw, and the transient correction amount ΔQ. The reason for fixing the synchronous injection amount Qs is that the synchronous injection amount Qs is adapted to an appropriate value for reducing PN and PN may increase if the synchronous injection amount Qs is greatly changed by correction.

Then, the CPU 52 calculates a reach end timing AEs shown in section (a) of FIG. 12 based on the rotation speed NE, the charging efficiency η, the water temperature THW, and the intake phase difference DIN (S118). The reach end timing AEs refers to the target value of a timing at which fuel injected at the latest timing in the fuel injected from the port injection valve 16 reaches the position (IN in FIG. 10) in the closed period of the intake valve 18.

The CPU 52 calculates the injection start timing Is (crank angle) of the intake synchronous injection based on the reach end timing AEs obtained in the process of S118, the synchronous injection amount Qs, and the rotation speed NE (S120). The CPU 52 calculates the injection start timing Is to be more advanced when the synchronous injection amount Qs is large than when the synchronous injection amount Qs is small. Further, the CPU 52 calculates the injection start timing Is to be more advanced when the rotation speed NE is high than when the rotation speed NE is low. More specifically, the CPU 52 sets, as the injection start timing Is, the timing advanced with respect to the reach end timing AEs by a value obtained by adding an injection period, a travel time, and an invalid injection time of the port injection valve 16, which are determined by the synchronous injection amount Qs. The travel time refers to a required time for the fuel injected from the port injection valve 16 to reach the inlet IN of the combustion chamber 24. In the present embodiment, the travel time is a fixed value. The invalid injection time refers to the time by which fuel injection actually starts after the operation signal MS2, which causes the port injection valve 16 to open, is output.

Next, the CPU 52 calculates the injection start timing Ins of the asynchronous injection based on the injection start timing Is (S122). The time interval between the injection start timing Is and the injection end timing of the intake asynchronous injection is set to be greater than or equal to the above-described predetermined time that prevents the intake synchronous injection from starting before the intake asynchronous injection ends.

The above-described process is performed to set the injection start timing Is of the intake synchronous injection independently from the injection start timing Ins of the intake asynchronous injection. This is because the reach end timing AEs of the intake synchronous injection is easily affected in particular by PN and HC in exhaust gas.

The CPU 52 operates the port injection valve 16 by outputting the operation signal MS2 to the port injection valve 16 so that the fuel of the asynchronous injection amount Qns is injected at the injection start timing Ins and then the fuel of the synchronous injection amount Qs is injected at the injection start timing Is (S124).

When determining that no request for the multiple injection process has been issued (S112: NO), the CPU 52 calculates an injection start timing Isin of the single injection (S126). More specifically, as shown in section (b) of FIG. 12, the CPU 52 sets, as a reach end timing AEns, the timing advanced by a predetermined amount Δ1 with respect to the timing at which the intake valve 18 starts opening. Subsequently, the CPU 52 sets, as the injection start timing Isin, the timing advanced with respect to the reach end timing AEns by a value obtained by adding the injection period, the travel time, and the invalid injection time of the port injection valve 16, which are determined by the requested injection amount Qd. Referring back to FIG. 13, the CPU 52 operates the port injection valve 16 by outputting the operation signal MS2 of the port injection valve 16 to cause the fuel of the requested injection amount Qd to be injected at the injection start timing Isin (S124).

When completing the process of steps S124, the CPU 52 temporarily ends the series of processes shown in FIG. 13.

Figure 14:
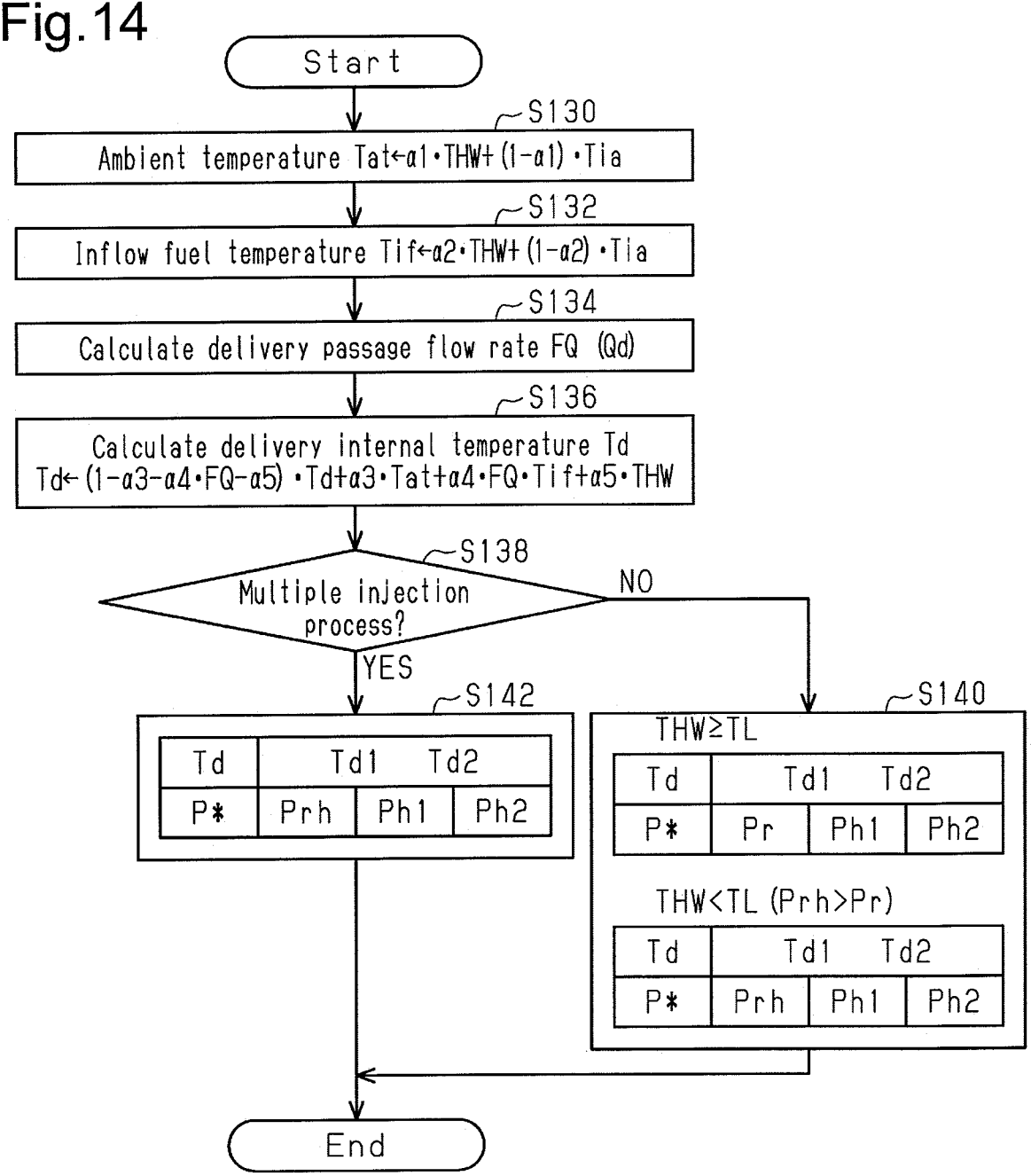
FIG. 14 is a flowchart illustrating the procedure for a target fuel pressure calculation process in the internal combustion engine of FIG. 10.

FIG. 14 illustrates a procedure for the target fuel pressure calculation process M10. The processes shown in FIG. 14 are executed by the CPU 52 repeatedly executing programs stored in the ROM 54 at a predetermined interval.

In a series of processes shown in FIG. 14, the CPU 52 first calculates an ambient temperature Tat, which is the surrounding temperature of fuel in the delivery pipe 49, based on the water temperature THW and the intake temperature Tia (S130). More specifically, the CPU 52 sets the ambient temperature Tat to a weighted moving average process value of the water temperature THW and the intake temperature Tia. That is, a weight coefficient α1, which is greater than or equal to 0 and less than or equal to 1, is used to set α1·THW+(1−α1)·Tia. The water temperature THW is a parameter indicating the temperature of the internal combustion engine 10. The intake temperature Tia is a parameter indicating the temperature of external air. The ambient temperature Tat is presumably a value between the intake temperature Tia and the water temperature THW. Thus, the weighted moving average process value is used as the ambient temperature Tat.

Next, the CPU 52 calculates an inflow fuel temperature Tif, which is the temperature of fuel flowing into the delivery pipe 49, based on the water temperature THW and the intake temperature Tia (S132). More specifically, the CPU 52 sets the inflow fuel temperature Tif to a weighted moving average process value of the water temperature THW and the intake temperature Tia. That is, a weight coefficient $\alpha 2$, which is greater than or equal to 0 and less than or equal to 1, is used to set $\alpha 2 \cdot THW+(1-\alpha 2) \cdot Tia$. The inflow fuel temperature Tif is presumably a value between the intake temperature Tia and the water temperature THW. Thus, the weighted moving average process value is used as the inflow fuel temperature Tif.

Subsequently, the CPU 52 calculates a delivery passage flow rate FQ, which is the flow rate of fuel passing through the delivery pipe 49 per unit time, based on the requested injection amount Qd (S134). The delivery passage flow rate FQ is a dimensionless quantity proportional to an actual flow rate of fuel.

The CPU 52 updates a delivery internal temperature Td using a weighted moving average process value of the delivery internal temperature Td, which is the temperature of fuel in the delivery pipe 49, the ambient temperature Tat, a value obtained by multiplying the inflow fuel temperature Tif by the delivery passage flow rate FQ, and the water temperature THW (S136). The water temperature THW is regarded as the temperature of the port injection valve 16. The temperature of fuel in the delivery pipe 49 presumably depends on the ambient temperature Tat, the temperature of the port injection valve 16, and the temperature of fuel flowing into the delivery pipe 49. The influence of the fuel flowing into the delivery pipe 49 depends not only on the temperature of the fuel but also on the flow rate of the fuel. Thus, the value obtained by multiplying the inflow fuel temperature Tif by the delivery passage flow rate FQ is used. More specifically, weight coefficients $\alpha 3$, $\alpha 4$, and $\alpha 5$, which are greater than or equal to 0 and less than or equal to 1, are used to set $(1-\alpha 3-\alpha 4 \cdot FQ-\alpha 5) \cdot Td+\alpha 3 \cdot Tat+\alpha 4 \cdot FQ \cdot Tif+\alpha 5 \cdot THW$.

$\alpha 3+\alpha 4 \cdot FQ+\alpha 5$ is less than or equal to 1.

Subsequently, the CPU 52 determines whether the current time is to perform the multiple injection process (S138). When determining that the current time is to perform the single injection process (S138: NO), the CPU 52 variably sets the target fuel pressure P* in accordance with the water temperature THW and the delivery internal temperature Td (S140). More specifically, in a case in which the water temperature THW is greater than or equal to a predetermined temperature TL (for example, 20° C.), when the delivery internal temperature Td is less than a first temperature Td1, the CPU 52 sets the target fuel pressure P* to a reference pressure Pr (for example, 300 to 350 kPa). The CPU 52 sets the target fuel pressure P* to a vapor reducing first pressure Ph1 (for example, 500 to 550 kPa) when the delivery internal temperature Td is greater than or equal to the first temperature Td1 and less than a second temperature Td2. The CPU 52 sets the target fuel pressure P* to a vapor reducing second pressure Ph2 (for example, 580 to 620 kPa) when the delivery internal temperature Td is greater than or equal to the second temperature Td2. When the water temperature THW is greater than or equal to the first temperature Td1, the CPU 52 increases the target fuel pressure P* in order to limit the evaporation of fuel.

Even if the water temperature THW is less than the predetermined temperature TL, when the delivery internal temperature Td is greater than or equal to the first temperature Td1, the CPU 52 sets the target fuel pressure P* to the same value as when the water temperature THW is greater than or equal to the predetermined temperature TL. When the delivery internal temperature Td is less than the first temperature Td1, the CPU 52 set the target fuel pressure P* to a second reference pressure Prh (for example, 380 to 420 kPa), which is higher than the reference pressure Pr. Such a setting is made to ensure that fuel is injected in a limited rotation angle region of the crankshaft 28 when the water temperature THW is low even if the requested injection amount Qd becomes large as the low-temperature increase coefficient Kw becomes large.

When determining that the current time is to perform the multiple injection process (S138: YES), the CPU 52 sets the target fuel pressure P* to the same value in accordance with the delivery internal temperature Td as when the water temperature THW is less than the predetermined temperature TL in a case in which the single injection process is performed (S142). This process is performed in view of the fact that the fuel injected from the port injection valve 16 is atomized to a larger extent when the pressure of the fuel is high than when the pressure of the fuel is low. That is, when fuel is atomized, atomization is expedited. Thus, as compared to when, for example, the target fuel pressure P* is set to the reference pressure Pr instead of the second reference pressure Prh, the amount of fuel that collects on and remains in the intake system without flowing into the combustion chamber 24 is reduced. Consequently, PN is reduced.

In the present embodiment, in some cases, the internal combustion engine 10 is mounted in a hybrid vehicle, the above-described condition (iii) is basically satisfied when an anomaly does not occur. Particularly, in the present embodiment, in a case in which the water temperature THW is greater than or equal to the predetermined temperature TL, when the target fuel pressure P* is set to the reference pressure Pr during the multiple injection process, the interval between the injection end timing of the intake asynchronous injection and the injection start timing Is of the intake synchronous injection can be maintained at the above-described predetermined time or longer. That is, in the present embodiment, the target fuel pressure P* is increased during the multiple injection process with the intention of atomizing fuel, not the intention of ensuring the interval between the intake asynchronous injection and the intake synchronous injection.

The reason for setting the target fuel pressure P* to the reference pressure Pr during the second reference pressure Prh is that the amount of energy consumption of the feed pump 48 is lower than when the target fuel pressure P* is set to the second reference pressure Prh. During the single injection process, PN is not easily noticeable. Thus, the collection of fuel in the intake passage 12 is negligible. Accordingly, the target fuel pressure P* is set to the reference pressure Pr in terms of reducing the amount of energy consumption.

The operation and advantages of the present embodiment will now be described.

The CPU 52 calculates the synchronous injection amount Qs based on the rotation speed NE, the charging efficiency η, the water temperature THW, and the intake phase difference DIN and calculates the asynchronous injection amount Qns by subtracting the synchronous injection amount Qs from the requested injection amount Qd. In this manner, the synchronous injection amount Qs can be set to a suitable amount for reducing PN by variably setting the synchronous injection amount Qs based on the above-described parameters.

Figure 15A:
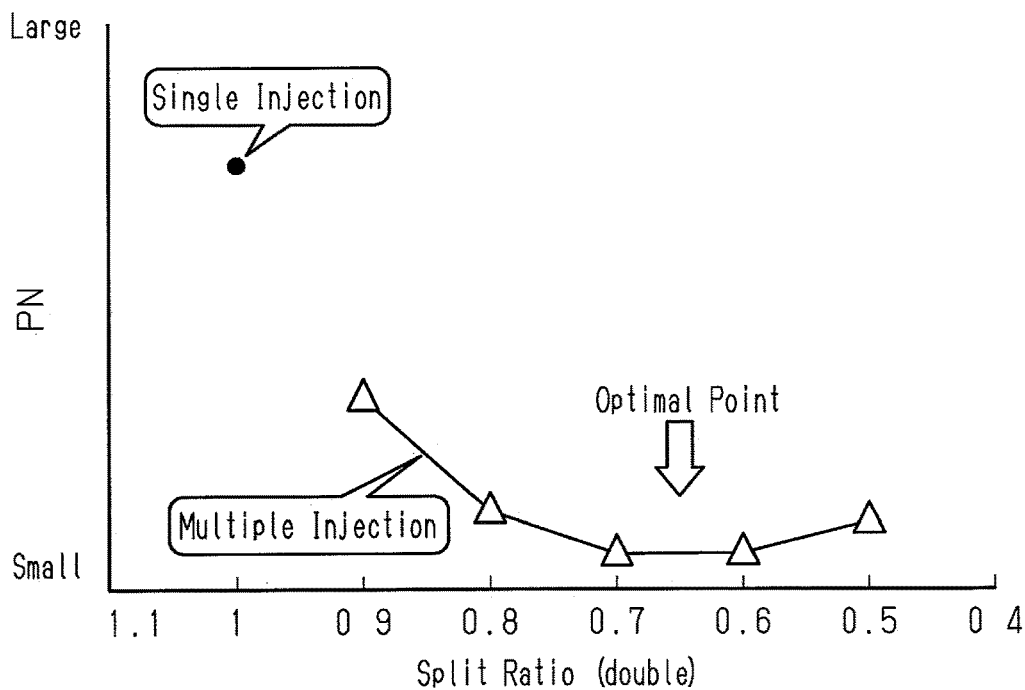
FIG. 15A is a graph showing the relationship between PN and the ratio of a synchronous injection amount to an asynchronous injection amount in the internal combustion engine of FIG. 10.
Figure 15B:
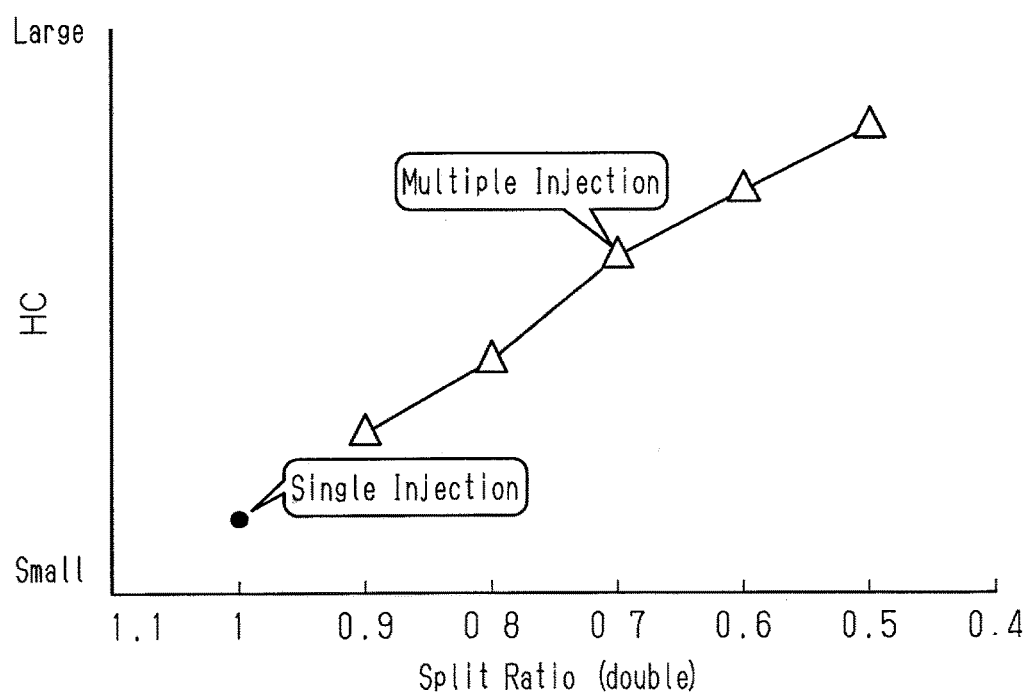
FIG. 15B is a graph showing the relationship between HC and the ratio of the synchronous injection amount to the asynchronous injection amount in the internal combustion engine of FIG. 10.

FIG. 15A shows the relationship between a split ratio of the asynchronous injection amount Qns occupying the requested injection amount Qd and the concentration of PN in exhaust gas discharged to the exhaust passage 32. FIG. 15B shows the relationship between a split ratio of the asynchronous injection amount Qns occupying the requested injection amount Qd and the concentration of HC in exhaust gas discharged to the exhaust passage 32. As shown in FIG. 15A, PN has a minimal value corresponding to the split ratio. The minimal value changes depending on the rotation speed NE, the charging efficiency η, the water temperature THW, and the intake phase difference DIN. Thus, in the present embodiment, the synchronous injection amount Qs is optimized in accordance with these parameters. As shown in FIG. 15B, as the ratio of the asynchronous injection amount Qns increases, the concentration of HC in exhaust gas decreases. This is because a longer atomization time can be obtained by the intake asynchronous injection than by the intake synchronous injection and thus atomization is expedited. The reason for prioritizing the reduction of PN is that HC in exhaust gas can be removed as long as the concentration of the HC in the exhaust gas becomes excessively high.

Correspondence

The correspondence between the items in the above embodiments and the items described in the above-described SUMMARY is as follows. In the following description, the correspondence is shown for each of the numbers in the examples described in the SUMMARY.

[6], [9] The synchronous injection amount calculation process corresponds to the process of S114. The increase correction process corresponds to the increase coefficient calculation process M36 and the process of S110. The transient correction process corresponds to the transient correction amount calculation process M38 and the process of S110. The asynchronous injection amount calculation process corresponds to the process of S116. The operation process corresponds to the process of S124 subsequent to the process of S122.

[7] In Example 7, the increase coefficient calculation process M36 corresponds to the process for calculating the low-temperature increase coefficient Kw based on the intake pressure Pin.

[8] The valve actuation variable device corresponds to the intake valve timing adjustment device 44. The valve actuation controlling process corresponds to the target intake phase difference calculation process M16 and the intake phase difference control process M18.

[10] The adjustment device corresponds to feed pump 48, and the selection process corresponds to the process of S112. The fuel pressure varying process corresponds to the target fuel pressure calculation process M10 and the pump operation process M12.

Modifications

The above-described embodiments may be modified as follows. The above-described embodiment and the following modifications may be implemented in combination with each other as long as technical contradiction does not occur.

Increase Correction Process

In the above-described embodiment, the low-temperature increase coefficient Kw is calculated, based on the water temperature THW and the intake pressure Pin. Instead, for example, the low-temperature increase coefficient Kw may be calculated based on the water temperature THW and the charging efficiency η in view of the fact that the intake pressure Pin correlates with the charging efficiency η. In this case, since the intake pressure increases, the low-temperature increase coefficient Kw is set to be a larger value when the charging efficiency η is high than when the charging efficiency η is low.

Further, the intake pressure Pin does not have to be an estimation value. Instead, for example, the intake pressure Pin may be a detection value of an intake pressure sensor that is arranged downstream of the throttle valve 14 in the intake passage 12.

Transient Correction Process

In the above-described embodiment, the transient correction amount is calculated in accordance with the charging efficiency η, the rotation speed NE, the water temperature THW, and the intake phase difference DIN and in accordance with whether the single injection process or the multiple injection process is performed. Instead, for example, the base injection amount Qb may be used instead of the charging efficiency η. Further, the transient correction amount ΔQ may be calculated based on only four of the five parameters or based on only one to three of the five parameters. The transient correction amount ΔQ needs to be calculated based on a change amount of the charging efficiency η by at least referring to the charging efficiency η and its equivalent value.

Correction Process

In the above-described embodiment, the base injection amount Qb is corrected using the transient correction amount ΔQ and the low-temperature increase coefficient Kw. Instead, for example, the base injection amount Qb may be corrected only using the low-temperature increase coefficient Kw instead of the transient correction amount ΔQ. Alternatively, for example, the base injection amount Qb may be corrected only using the transient correction amount ΔQ instead of the low-temperature increase coefficient Kw.

Synchronous Injection Amount Calculation Process

In the above-described embodiment, map calculation is performed for the synchronous injection amount Qs using the map data that includes the rotation speed NE, the charging efficiency the intake phase difference DIN, and the water temperature THW are input variables and includes the synchronous injection amount Qs as an output variable. Instead, for example, the synchronous injection amount Qs may be calculated by performing map calculation for abase value of the synchronous injection amount with map data that includes the rotation speed NE, the charging efficiency η, and the intake phase difference DIN as input variables and includes the synchronous injection amount Qs as an output variable, then performing map calculation for a correction coefficient with map data that includes the water temperature THW as an input variable and the correction coefficient as an output variable, and correcting the base value with the correction coefficient.

The synchronous injection amount Qs does not have to be calculated based on the rotation speed NE, the charging efficiency η, the intake phase difference DIN, and the water temperature THW. Instead, for example, the synchronous injection amount Qs may be calculated based on only the charging efficiency η, the intake phase difference DIN, and the water temperature THW of the four parameters, only the rotation speed NE, the charging efficiency η, and the water temperature THW, or only the charging efficiency η and the water temperature THW.

The parameter indicating the amount of air filling the combustion chamber 24 is not limited to the charging efficiency η and may be the base injection amount Qb. Further, for example, the intake pressure Pin may be used as the parameter in view of the correlation between the intake pressure Pin and the charging efficiency η.

Correction of Synchronous Injection Amount Qs

In the above-described embodiment, the correction amount for the base injection amount is all included in the asynchronous injection amount Qns, and the value calculated in the process of S114 is used as the synchronous injection amount Qs. However, this configuration does not have to be used. Instead, for example, as long as the base injection amount Qb is accurately corrected using the correction amount of the feedforward control by correcting the base injection amount Qb with the low-temperature increase coefficient Kw and the transient correction amount ΔQ, the feedback correction coefficient KAF does not become significantly large. Accordingly, the feedback correction coefficient KAF may be used to correct the synchronous injection amount Qs. This can be achieved by multiplying the feedback correction coefficient KAF by both the synchronous injection amount Qs and the asynchronous injection amount Qns after calculating the asynchronous injection amount Qns as Kw·Qb+ΔQ−Qs.

Fuel Pressure Varying Process

In the above-described embodiment, in a case in which the multiple injection process is executed when the delivery internal temperature Td is less than the first temperature Td1, the target fuel pressure P* is set to the second reference pressure Prh, which is the same value as when the water temperature THW is less than the predetermined temperature TL in the single injection process. Instead, for example, the target fuel pressure P* of the multiple injection process may be set to a higher pressure than when the water temperature THW is less than the predetermined temperature TL in the single injection process.

In the above-described embodiment, when the delivery internal temperature Td is greater than or equal to the first temperature Td1, the target fuel pressure P* is set to be the same in the multiple injection process and the single injection process. Instead, the target fuel pressure P* may be set to be higher when the multiple injection process is performed than when the single injection process is performed.

Additionally, for example, the target fuel pressure P* does not have to be variable in accordance with the delivery internal temperature Td. Instead, for example, the target fuel pressure P* may be variably set in accordance with the operating point of the internal combustion engine 10. Even in this case, making the target fuel pressure P* higher in the multiple injection process than in the single injection process is effective for making the effect of reducing PN noticeable.

The intention of making the target fuel pressure P* higher in the multiple injection process than in the single injection process is not limited to the reduction of PN. Instead, for example, the intention may be to ensure the time interval between the injection end timing of the intake asynchronous injection and the injection start timing Is of the intake synchronous injection.

Temperature of Intake System

In the above-described configuration, the water temperature THW is used as the temperature of the intake system. Instead, for example, the temperature of lubricant for the internal combustion engine 10 may be used as the temperature of the intake system.

Intake Synchronous Injection

In the above-described embodiment, the reach end timing AEs is set based on the rotation speed NE, the charging efficiency η, the water temperature THW, and the intake phase difference DIN. Instead, for example, the injection start timing Is may be directly set based on the rotation speed NE, the charging efficiency η, the water temperature THW, and the intake phase difference DIN. Additionally, for example, the base injection amount Qb may be used instead of the charging efficiency η as a parameter that indicates load, which is a parameter indicating the amount of air filling the combustion chamber 24. Further, the reach end timing AEs and the injection start timing Is may be variably set based on only one, two, or three of the four parameters, namely, the rotation speed NE, the load, the water temperature THW, and the intake phase difference DIN.

Selection Process

The conditions for selecting the multiple injection process are not limited to those exemplified in the above-described embodiment. Instead, the above-described condition (iii) may be replaced with a condition in which the charging efficiency η is less than a predetermined value. The predetermined value is greater than the given value used for the above-described condition (ii). Additionally, for example, the given temperature Tth in the above-described condition (i) does not have to be the same as the given temperature Tth, which determines the water temperature THW when the low-temperature increase coefficient Kw is a value greater than 1.

Intake Asynchronous Injection

In the above-described embodiment, the intake asynchronous injection is to inject fuel such that the period in which the fuel injected from the port injection valve 16 reaches the position of the intake valve 18 prior to opening is within the closed period of the intake valve 18. Instead, when the rotation speed NE is high and the asynchronous injection amount Qns is excessively large, part of the period in which the fuel injected from the port injection valve 16 reaches the position of the intake valve 18 prior to opening may overlap the open period of the intake valve 18.

Single Injection Process

In the above-described embodiment, the single injection process is a process for injecting fuel such that the period in which the fuel injected from the port injection valve 16 reaches the position of the intake valve 18 prior to opening is within the closed period of the intake valve 18. Instead, when the rotation speed NE is high and the requested injection amount Qd is large, part of the period in which the fuel injected from the port injection valve 16 reaches the position of the intake valve 18 prior to opening may overlap the open period of the intake valve 18. The single injection process does not have to be executed.

Valve Actuation Controlling Process

In the above-described embodiment, the target intake phase difference DIN* is variably set in accordance with the rotation speed NE and the charging efficiency η. Instead, for example, except when the water temperature THW is low, an actual timing may be limited to retarded with respect to the open timing of the intake valve 18 that is determined in accordance with the rotation speed NE and the charging efficiency η.

Actuation Varying Device for Intake Valve

The actuation varying device that changes the actuation of the intake valve 18 is not limited to the intake valve timing adjustment device 44. For example, the actuation varying device may be a device that changes a lift amount of the intake valve 18. In this case, the parameter indicating the timing in which the intake valve 18 is open is the lift amount or the like instead of the intake phase difference DIN.

Control Device

The control device is not limited to a device that includes the CPU 52 and the ROM 54 and executes software processing. For example, at least part of the processes executed by the software in the above-illustrated embodiment may be executed by hardware circuits dedicated to executing these processes (such as ASIC). That is, the control device may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Others

The internal combustion engine 10 does not need to include the actuation varying device that changes the actuation of the intake valve 18. The internal combustion engine 10 does not need to include the throttle valve 14.

The invention claimed is:

1. A control device for fuel injection of an internal combustion engine, the internal combustion engine that is subject to control performed by the control device including a port injection valve that injects fuel into an intake passage, wherein the control device is configured to execute:
    a requested injection amount calculation process for calculating a requested injection amount for controlling an air-fuel ratio to a target air-fuel ratio based on an air amount filling a cylinder of the internal combustion engine; and
    an operation process for operating the port injection valve in order to inject fuel of the requested injection amount, and
    the operation process includes a multiple injection process for injecting fuel in sequence from an intake asynchronous injection to an intake synchronous injection by splitting the fuel of the requested injection amount so as to variably set a synchronous injection amount and an asynchronous injection amount in accordance with load that is a physical quantity having a correlation with the filling air amount, the synchronous injection amount being an injection amount of the intake synchronous injection of injecting fuel in synchronization with an open period of an intake valve, the asynchronous injection amount being an injection amount of the intake asynchronous injection of injecting fuel at a timing that is more advanced than a timing of the intake synchronous injection.

2. The control device according to claim 1, wherein
the operation process executes the multiple injection process on the condition that the temperature of the internal combustion engine is less than or equal to a predetermined temperature and injects the fuel of the requested injection amount with a single fuel injection when the temperature of the internal combustion engine is greater than the predetermined temperature, and
the single fuel injection starts injecting at a timing that is more advanced than an open timing of the intake valve.

3. The control device according to claim 1, wherein
the operation process includes a process for executing the multiple injection process on the condition that the load is greater than or equal to a predetermined value and injecting the fuel of the requested injection amount with a single fuel injection when the load is less than the predetermined value, and
the single fuel injection starts injecting at a timing that is more advanced than an open timing of the intake valve.

4. The control device according to claim 1, wherein
the control device is further configured to execute a variably setting process for variably setting an injection start timing of the intake asynchronous injection based on the temperature of the internal combustion engine, and
a difference in the injection start timing of the intake asynchronous injection between when the temperature of the internal combustion engine is a first temperature and when the temperature is a second temperature is greater than a difference in an injection start timing of the intake synchronous injection between when the temperature is the first temperature and when the temperature is the second temperature, the second temperature being higher than the first temperature.

5. The control device according to claim 1, wherein
the operation process includes
    a process for calculating, when starting the internal combustion engine, the synchronous injection amount and the asynchronous injection amount based on the temperature of the internal combustion engine regardless of the air amount filling the cylinder, and
    a process for injecting fuel of the asynchronous injection amount with the intake asynchronous injection and then injecting fuel of the synchronous injection amount with the intake synchronous injection, and
the control device further executes, when starting the internal combustion engine, a variably setting process for variably setting an injection start timing of the intake asynchronous injection based on the temperature of the internal combustion engine.

6. The control device according to claim 1, wherein the control device is configured to execute:
    a base injection amount calculation process for calculating a base injection amount that is proportional to the air amount filling the cylinder of the internal combustion engine;
    a synchronous injection amount calculation process for calculating the synchronous injection amount in accordance with the filling air amount and the temperature of an intake system of the internal combustion engine;
    a correction process including at least one of two processes that are a transient correction process and an increase correction process, the transient correction process correcting the base injection amount with a transient correction amount when the filling air amount changes, the increase correction process correcting the base injection amount with an increase correction ratio that is larger when the temperature of the intake system is low than when the temperature of the intake system is high; and
    an asynchronous injection amount calculation process for calculating the asynchronous injection amount based on a value obtained by subtracting the synchronous injection amount from the base injection amount corrected by the correction process.

7. The control device according to claim 6, wherein
the correction process includes the increase correction process, and
the increase correction process includes a process for making the increase correction ratio larger when pressure of a fluid in the intake passage to which fuel is added by the port injection valve is high than when the pressure is low even if the temperature of the intake system is the same.

8. The control device according to claim 6, wherein
the internal combustion engine includes a valve actuation variable device configured to vary a valve actuation of the intake valve,
the control device is further configured to execute a valve actuation controlling process for variably controlling an opening start timing of the intake valve by operating the valve actuation variable device, and
the synchronous injection amount calculation process is a process for calculating the synchronous injection amount in accordance with the opening start timing of the intake valve in addition to the filling air amount and the temperature of the intake system.

9. The control device according to claim 8, wherein the synchronous injection amount calculation process is a process for calculating the synchronous injection amount in accordance with a rotation speed of a crankshaft of the internal combustion engine in addition to the filling air amount, the temperature of the intake system, and the opening start timing of the intake valve.

10. The control device according to claim 6 wherein
the internal combustion engine includes an adjustment device that adjusts pressure of fuel supplied to the port injection valve,
the control device is further configured to execute:
a selection process for selecting a single injection process or the multiple injection process, the single injection process injecting, with the intake asynchronous injection, fuel corresponding to the base injection amount corrected through the correction process by operating the port injection valve, the multiple injection process including the intake asynchronous injection and the intake synchronous injection; and
a fuel pressure varying process for variably controlling the pressure of the fuel by operating the adjustment device,
the operation process is a process for executing a process selected by the selection process, and
the fuel pressure varying process includes a process for making the pressure of the fuel higher when the multiple injection process is executed than when the single injection process is executed.

11. A control method for fuel injection of an internal combustion engine, the internal combustion engine that is subject to control performed by the control method including a port injection valve that injects fuel into an intake passage, wherein the control method comprises:

calculating a requested injection amount for controlling an air-fuel ratio to a target air-fuel ratio based on an air amount filling a cylinder of the internal combustion engine; and
operating the port injection valve in order to inject fuel of the requested injection amount, and
operating the port injection valve includes a multiple injection process for injecting fuel in sequence from an intake asynchronous injection to an intake synchronous injection by splitting the fuel of the requested injection amount so as to variably set a synchronous injection amount and an asynchronous injection amount in accordance with load that is a physical quantity having a correlation with the filling air amount, the synchronous injection amount being an injection amount of the intake synchronous injection of injecting fuel in synchronization with an open period of an intake valve, the asynchronous injection amount being an injection amount of the intake asynchronous injection of injecting fuel at a timing that is more advanced than a timing of the intake synchronous injection.

12. A non-transitory computer readable medium that stores a program for causing a processor to execute a control process of fuel injection for an internal combustion engine, the internal combustion engine that is subject to control performed by the control process including a port injection valve that injects fuel into an intake passage, wherein the control process includes
calculating a requested injection amount for controlling an air-fuel ratio to a target air-fuel ratio based on an air amount filling a cylinder of the internal combustion engine, and
operating the port injection valve in order to inject fuel of the requested injection amount, and
operating the port injection valve includes a multiple injection process for injecting fuel in sequence from an intake asynchronous injection to an intake synchronous injection by splitting the fuel of the requested injection amount so as to variably set a synchronous injection amount and an asynchronous injection amount in accordance with load that is a physical quantity having a correlation with the filling air amount, the synchronous injection amount being an injection amount of the intake synchronous injection of injecting fuel in synchronization with an open period of an intake valve, the asynchronous injection amount being an injection amount of the intake asynchronous injection of injecting fuel at a timing that is more advanced than a timing of the intake synchronous injection.

* * * * *